(12) United States Patent  (10) Patent No.: US 8,777,828 B2
Zimmer et al.  (45) Date of Patent: Jul. 15, 2014

(54) METHOD AND SYSTEM FOR CREATING CO-LAYER SURFACE ADHESIVE RULE

(75) Inventors: Michael Zimmer, Moshav Beit-Elazari (IL); Aviv Ratzman, Mazkeret Batia (IL); David Idan, Moshav Emunim (IL); Lior Dahan, Ramat Gan (IL); Kostantin Spiryagin, Petah-Tikva (IL)

(73) Assignee: Highcon Systems Ltd., Yavne (IL)

( * ) Notice: Subject to any disclaimer, the term of this patent is extended or adjusted under 35 U.S.C. 154(b) by 666 days.

(21) Appl. No.: 13/108,450

(22) Filed: May 16, 2011

(65) Prior Publication Data

US 2012/0129672 A1  May 24, 2012

Related U.S. Application Data

(60) Provisional application No. 61/345,180, filed on May 17, 2010.

(51) Int. Cl.
| B31B 1/14 | (2006.01) |
| C08L 23/02 | (2006.01) |
| C08L 75/04 | (2006.01) |
| C08L 23/16 | (2006.01) |
| B31B 1/20 | (2006.01) |
| C08L 77/00 | (2006.01) |

(52) U.S. Cl.
CPC . *B31B 1/20* (2013.01); *C08L 23/02* (2013.01); *C08L 75/04* (2013.01); *C08L 23/16* (2013.01); *C08L 77/00* (2013.01); *C08G 2280/00* (2013.01)
USPC .......................................................... 493/340

(58) Field of Classification Search
USPC ..................... 493/340, 56, 143, 150
See application file for complete search history.

(56) References Cited

U.S. PATENT DOCUMENTS

| 2,185,885 | A |   | 1/1940  | Bruker et al. |
| 2,524,962 | A | * | 10/1950 | Dalsemer ................... 493/371 |
| 3,170,342 | A |   | 2/1965  | Downie |
| 3,470,773 | A | * | 10/1969 | Mueller .................... 76/107.1 |
| 3,598,010 | A |   | 8/1971  | Chambon |
| 3,744,384 | A |   | 7/1973  | Jarritt et al. |
| 3,884,132 | A |   | 5/1975  | Snodgrass |
| 3,973,476 | A |   | 8/1976  | Marshall |
| 4,102,045 | A | * | 7/1978  | Bergh ........................ 30/287 |
| 4,195,557 | A | * | 4/1980  | Kang ........................ 493/324 |
| 4,289,492 | A |   | 9/1981  | Simpson |

(Continued)

FOREIGN PATENT DOCUMENTS

| CN | 1408538 | 4/2003 |
| DE | 3840753 A1 | 6/1990 |

(Continued)

OTHER PUBLICATIONS

Extended European Search Report dated Mar. 14, 2013.

(Continued)

*Primary Examiner* — Hemant M Desai
(74) *Attorney, Agent, or Firm* — Daniel Feigelson; Fourth Dimension IP

(57) ABSTRACT

A co-layer surface-adhesive rule (SAR) that has a pre-defined cross-section profile. The co-layer surface-adhesive rule (SAR) has two or more layers, wherein at least one layer is made from flexible material and wherein at least two layers differ one from the other.

30 Claims, 25 Drawing Sheets

A-A section view

(56) References Cited

U.S. PATENT DOCUMENTS

| | | | |
|---|---|---|---|
| 4,810,545 A * | 3/1989 | Snodgrass | 428/43 |
| 5,021,042 A | 6/1991 | Resnick et al. | |
| 5,121,329 A | 6/1992 | Crump | |
| 5,194,064 A | 3/1993 | Simpson et al. | |
| 5,943,935 A | 8/1999 | Brayton et al. | |
| 5,967,015 A | 10/1999 | Grebe | |
| 6,085,625 A * | 7/2000 | Sandford | 83/698.31 |
| 6,105,492 A | 8/2000 | Fergen | |
| 6,129,040 A | 10/2000 | Viggiano et al. | |
| 6,203,482 B1 | 3/2001 | Sandford | |
| 6,441,338 B1 | 8/2002 | Rabinovich | |
| 6,779,426 B1 | 8/2004 | Holliday | |
| 6,925,918 B1 * | 8/2005 | Bunge | 83/116 |
| 7,500,846 B2 | 3/2009 | Eshed et al. | |
| 8,166,858 B2 * | 5/2012 | Luquette | 83/115 |
| 8,323,777 B2 * | 12/2012 | Albert et al. | 428/172 |
| 2002/0142143 A1* | 10/2002 | Schulz et al. | 428/195 |
| 2004/0035311 A1 | 2/2004 | Moll | |
| 2004/0127614 A1 | 7/2004 | Jiang et al. | |
| 2004/0237722 A1 | 12/2004 | Ponemayr | |
| 2005/0045015 A1* | 3/2005 | Brayton et al. | 83/828 |
| 2005/0215405 A1* | 9/2005 | Corcoran | 493/143 |
| 2007/0028743 A1 | 2/2007 | Jakob | |
| 2009/0013830 A1 | 1/2009 | Pfaff | |
| 2009/0136679 A1 | 5/2009 | Boukaftane et al. | |

FOREIGN PATENT DOCUMENTS

| | | |
|---|---|---|
| DE | 10356900 A1 | 7/2005 |
| DE | 102004029036 A1 | 12/2005 |
| DE | 102006014383 A1 | 10/2007 |
| EP | 1346803 A2 | 9/2003 |
| EP | 1640938 A1 | 3/2006 |
| EP | WO2007028557 A1 | 3/2007 |
| EP | 2036659 A1 | 3/2009 |
| EP | 2087972 A1 | 8/2009 |
| EP | 2110185 A1 | 10/2009 |
| FI | WO2006075054 A1 | 7/2006 |
| FR | 2899502 A1 | 10/2007 |
| GB | 1192843 | 5/1970 |
| GB | 2316032 A | 2/1998 |
| JP | 1130920 | 5/1989 |
| JP | 3290235 | 12/1991 |
| JP | 11188804 | 7/1999 |
| JP | 2004043018 | 2/2004 |
| JP | 2002239996 | 3/2004 |
| WO | 2011/020518 A1 | 2/2011 |

OTHER PUBLICATIONS

Notification of Transmittal of the International Search Report and the Written Opinion of the International Searching Authority, or the Declaration, Mailed Nov. 9, 2011.

* cited by examiner

A-A section view

A-A section view ial application for patent under Title
35 U.S.C. §100 et seq. and 37 C.F.R. §1.53(b) and, claiming
the benefit of the prior filing date under Title 35, U.S.C.
§119(e) of the U.S. provisional application for patent that was
filed on May 17, 2010 and assigned Ser. No. 61/345,180,
which application is incorporated herein by reference in its
entirety. This application is related to and filed concurrently
with: U.S. application Ser. No. 13/108,312 bearing the title of
FLEXIBLE MATERIAL FOR SURFACE ADHESIVE
RULE, filed on May 16, 2011 under the; U.S. application Ser.
No. 13/108,389 bearing the title of METHOD AND SYSTEM FOR SURFACE ADHESIVE RULE TECHNOLOGY,
filed on May 16, 2011 under the; and U.S. application Ser. No.
13/108,526 bearing the title of METHOD AND SYSTEM
FOR CREATING SURFACE ADHESIVE RULE
COUNTER DIE, filed on May 16, 2011 under the, all of
which are incorporated herein by reference.

METHOD AND SYSTEM FOR CREATING CO-LAYER SURFACE ADHESIVE RULE

CROSS-REFERENCE TO RELATED APPLICATIONS

This is a utility patent application being filed in the United
States as a non-provisional application for patent under Title
35 U.S.C. §100 et seq. and 37 C.F.R. §1.53(b) and, claiming
the benefit of the prior filing date under Title 35, U.S.C.
§119(e) of the U.S. provisional application for patent that was
filed on May 17, 2010 and assigned Ser. No. 61/345,180,
which application is incorporated herein by reference in its
entirety. This application is related to and filed concurrently
with: U.S. application Ser. No. 13/108,312 bearing the title of
FLEXIBLE MATERIAL FOR SURFACE ADHESIVE
RULE, filed on May 16, 2011 under the; U.S. application Ser.
No. 13/108,389 bearing the title of METHOD AND SYSTEM FOR SURFACE ADHESIVE RULE TECHNOLOGY,
filed on May 16, 2011 under the; and U.S. application Ser. No.
13/108,526 bearing the title of METHOD AND SYSTEM
FOR CREATING SURFACE ADHESIVE RULE
COUNTER DIE, filed on May 16, 2011 under the, all of
which are incorporated herein by reference.

TECHNICAL FIELD

The present disclosure generally relates to die-cutting/creasing industry, and more particularly the disclosure relates to a system and method of manufacturing die-cutting/creasing and preparing pre-treated cardboards/papers.

BACKGROUND ART

The rapid evolution of trade around the world (globalization) creates a significant demand for packaging in order to transfer/distribute goods to different remote areas. The transport of goods may be done by: ship, airplanes, trucks, and so on. The transport of goods may be performed by: the manufacturer; different suppliers; individual persons; etc. Further, a significant demand for different brochures, flyers, etc., also takes part in trade. The different brochures/flyers may have pre-folds and/or embossing, for example. Embossing such as, but not limited to Braille writing.

Packaging takes a major role in the marketing today. The package in which the goods are packed and presented, in a store for example, may determine if the goods will be appealing to a potential buyer in the store or not. Thus the packaging appearance can have a direct effect on the sales of merchandise. The brochures, flyers, and so on may also contribute to the sales/awareness to a product/service etc.

Henceforth, throughout the description, drawings and claims of the present disclosure, the terms package, paperboard box, parcel, box, carton box, cardboard box, brochure, flyers, etc. may be used interchangeably. The present disclosure may use the term package as a representative term for the above group.

A known preliminary requirement, in order to construct a package, is preparing or purchasing a pre-treated cardboard and/or paper based material. Paper based material may be of different types. Exemplary types may be: waxed paper, cartridge paper, art paper, etc. Henceforth, throughout the description, drawings and claims of the present disclosure, the terms cardboard, card-stock, display board, corrugated fiberboard, paperboards of different paper based material, folding boxboard, carton, blanks, and so on, may be used interchangeably. The present disclosure may use the term cardboard as a representative term for the above group.

The pre-treatment of a cardboard may include the following acts: creating folding lines along the cardboard to ease and provide accurate folding of the cardboard; piercing the cardboard in different areas; creating embossment in different areas of the cardboard; cutting the raw cardboard into pre-defined shapes; and so on. Henceforth, the description, drawings and claims of the present disclosure the terms pre-folded cardboard, and pre-treated cardboard may be used interchangeably. The present disclosure may use the term pre-treated cardboard as a representative term for the above group.

Some common techniques for preparing a pre-treated cardboard include the acts of placing the cardboard between dies. Known dies are: a steel-rule die and a counter-die. The steel-rule die may include a variety of different types of dies. Exemplary types of dies can be: a cutting-die; a creasing-die; an embossing-die; a scoring-die; a combination of the different types of dies; and so on. The steel-rule die body is usually a hard-wood-based material. Exemplary hard-wood-based material may be: plywood, maple wood, etc. Other exemplary material may be: plastic, metal, fabric, etc. The body material is required to have a high-dimension stability and a high-grade and be without voids or other imperfections.

Jammed deeply and firmly into a plurality of pre-made slots inside the steel-rule die's body is a plurality of steel-rules. The pre-made slots hold the steel-rules in place during the production of the steel-rule die. Further, the pre-made slots support the steel-rule during the operation of the cutting/creasing/embossing of numerous cardboards. The steel-rules are usually cut and bent blades made of hardened steel, for example. Usually, around the steel-rules, a plurality of ejection (rebound) rubbers need to be placed and glued. Without the ejection rubber the cardboard may tend to get stuck amongst the steel rules.

The counter-die comprises a body. The body is usually a hard-wood-based material. Other exemplary material may be: plastic, metal, fabric, etc. Commonly, a plurality of trenches is grooved in the counter-die. The trenches location and structure is required to fit precisely to the location and structure of the steel-rules of the steel-rule die.

Known common techniques of manufacturing steel-rule dies include the acts of: preparing slots in the die's body (the wood for example) for the steel-rules. This is commonly done by a station using laser or special bandsaw, for example. Next a specialist cuts and bends the steel rule and positions them into the slots in the body. The positioning requires hammering the steel-rules deeply into the slots. Adjustments of the height of the steel-rule protruding from the body of the die are usually required as well. A specialist will then need to glue a plurality of ejection rubbers around the steel-rules.

Known common techniques of manufacturing the counter-dies include several actions. For example, during the production of the counter-die one or more inexpensive material (inserts) may be associated to the counter-die's body. The inserts may be associated to the body by screws, nails, re-positional adhesive, etc. The inserts may be made of phenolic-resin, paper, fabric, for example. The inserts may comprise trenches in it. The inserts are positioned so that their grooves/trenches are aligned/centered with the corresponding steel-rules of the steel-rule die. The alignment/centering of the inserts is usually performed by a specialist.

A trial cutting/creasing/embossing operation can then be made between the steel-rule die and the counter-die, together with a sheet of paper-based material between them, for example. If the alignment/centering is not satisfactory, the specialist detaches the inserts from the counter die and repositions them. If the alignment/centering is satisfactory, the specialist can groove trenches in the counter die's body precisely where the trenches of the insets were and detach the inserts from the body. In alternate embodiments, the inserts with the trenches may be left on the counter die's body and act as the trenches.

SUMMARY OF DISCLOSURE

In the common steel-rule die and counter-die industry, the rules material (steel, for example) enables the creasing/cutting/embossing of the cardboards while having a good sustainability and durability to the numerous slamming and pressure of the counter die on the steel-rule die during the cut/crease/emboss operation. The common rules (usually steel rules) are hammered deep inside the die's body (usually hardwood-based material) in order to enable and assure that they will be fixed in place even at the harsh operation which can be around a few ton press force (100 ton press for example) in a plurality of directions on the common rules. Commonly the steel-rules are inserted deep inside the die's body (18 mm, for example). The die's body thus is usually very dense heavy and thick and the grooves in the body, for the common rules, are usually deep.

The common steel-rule die and counter-die industry requires a complex operation and collaboration between different entities. Entities may be different companies, for example. For example, if a client requests a certain package to be made for him, the following scenario usually may take place in the common industry:

(a) A first entity may be a company that prepares a sample of a prototype of the requested package.

(b) This prototype needs to be transport to the client for approval, and, if the client does not approve. This step needs to be repeated until the client is satisfied.

(c) Next an order for a common steel-rule die and counter-die needs to be made. This step may be performed by a different entity (a second entity). The second entity needs to acquire die body (wood for example), steel-blades, and insert-material. People skilled in the art of die-making will need to: groove the die's body; cut and bend the steel-rules; hammer the steel-rules in place; glue the ejecting rubbers; attach the insert to the counter-die body; center and groove the counter-die's trenches in precise required location; etc.

(d) Next, the common steel-rule die and counter-die will need to be transferred (by truck, ship, airplane, etc.) to a third entity. The third entity will need to: install the received common steel-rule die and counter-die to a press/die machine; set-up the machine and fine tune it; insert cardboards; and gather the pre-treated cardboards.

(e) The common steel-rule die and counter-die will then need to be stored for future use. The storage is usually a big warehouse since the common steel-rule die and counter-die are very big and heavy.

(f) Lastly the pre-treated cardboards need to be sent to the client (by truck, ship, airplane, etc.).

Thus, those skilled in the art will appreciate that the common steel-rule die and counter-die industry requires different craftsmen, long time leads for production, relies heavily on transportation, consumes tons of wood and/or tons of steel, demands huge storage areas, generates environmental pollution, and involves a complex cooperation between different companies, etc.

The above-described deficiencies in common die-cut/crease/emboss industries do not intend to limit the scope of the inventive concepts in any manner. They are merely presented for illustrating an existing situation.

Among other things, the present disclosure provides a novel system, apparatus and method for a novel surface-adhesive-rule technology (SART). In the novel surface-adhesive-rule technology (SART), the rules may be adhered to the surface of the body of the die. Thus, there is no need to groove the body, place precisely and hammer the rules inside trenches of the die's body. In exemplary embodiments, the surface may be smooth; however, it will be appreciated that in alternate embodiments, the surface may not be smooth. For example the surface may be: scraped, laser burned, etc. The rules of the surface-adhesive-rule technology (SART) may include a variety of different types of rules. Exemplary types may include: cutting rules; creasing rules; embossing rules; etc. Henceforth, throughout the description, drawings and claims of the present disclosure, the terms cutting rules, creasing rules, embossing rules, etc. may be used interchangeably. The present disclosure may use the term rule as a representative term for the above group.

The novel surface-adhesive-rule technology (SART) enables the manufacture of a complete surface-adhesive-rule die with the creation of its surface-adhesive rules (SAR) by one machine. Thus, advantageously, utilizing the SART alleviates the requirement for complex operation between different companies. Furthermore, another advantage of the surface-adhesive-rule technology (SART) is that it may be fully automatic and controlled by a computer, for example. Thus, no skilled craftsmen (specialists) are required in the manufacturing of a die. In addition, the surface-adhesive-rule technology (SART) alleviates the need for warehouse space because the layout and all information related to the surface-adhesive-rule die may be stored on a computer or other storing medium such as CDROM, flash disc, etc. Thus the novel surface-adhesive-rule technology (SART) advantageously provides a low-cost, easy to use, friendly to the environment, and a shortened lead-time for production of a full surface-adhesive-rule die and counter die.

In exemplary embodiments, including some of the embodiments described in the present disclosure, the surface-adhesive rules (SAR) of the surface-adhesive-rule technology (SART) may be made of flexible-material. The flexible material may be liquid or gel like material. The flexible-material may include one or more different types of polymers or even different combination of differing types of polymers. Exemplary polymers that may be used may include: polyester, polyamide, polycarbonate, polyurethane, acrylic, polypropylene, polyethylene, etc. Furthermore, the flexible-material may include one or more additives. These additives may include, but not limited to: silica, ceramics, metal, various fibers, different fillers, etc.

In exemplary embodiments, the flexible material of the surface-adhesive rules (SAR) may comprise several layers (co-layer). Each layer may be made of different materials. Each layer may also have a different: shape; cross-section; width; comprise different polymer types and/or additives; etc. Each layer may have a different required attribute. For example the lower layer may be required to have better adhesive attributes, the highest layer may be required to have more elastic attributes, and so on.

The disclosed novel surface-adhesive rules (SAR) may have a strong enough sustainability, firmness, inside-cohesion, robustness, and/or lifespan to withstand the pressure and harsh operation of high pressure press force (1-10 ton, for example) in one or more directions on the surface-adhesive rules during the cutting/creasing/embossing operation of the cardboards.

The flexible material (the liquid or gel like material) of the SAR may have additional attributes (attributes). Exemplary attributes may include the ability of the flexible material to reserve the required surface-adhesive rule (SAR) profile while drawing the SAR on the surface-adhesive-rule die's body (SARD) surface. Wherein the reserve the required surface-adhesive rule (SAR) profile is within plus minus a few percentage (between 5-15 percent) from the profile of an orifice of a nozzle through which the flexible material is deposited (drawn) as a SAR for a period of few seconds to few hours, for example. Other exemplary embodiments the reserve the required surface-adhesive rule (SAR) profile may be plus minus a 10-30 percentage from the shape of the profile for a few minutes to tens of minutes, for example.

The ability to reserve the required surface-adhesive rule (SAR) profile while drawing the SAR may be achieved by attributes of the flexible material. Exemplary attributes of the flexible material such as, but not limited to: thixotropic, pseudo plastic, hardness, high viscosity, etc. The attributes required to enable reserving the required surface-adhesive rule (SAR) profile may be achieved by the composition of ingredients. Exemplary composition of ingredients may comprise: 7-50 percent additives such as but not limited to: silica, filers, etc. In other exemplary embodiments the range of the additives may be 10-30 percent. Other exemplary embodiments of composition of ingredients may comprise 60-85 percent polymer. Exemplary polymers such as but not limited to: SPF 918, polyurethane, etc. In yet other embodiments a combination of the above may be used.

Other exemplary attributes may include: flexibility, viscous, cohesive, brittle, tacky, erectness, spreading capabilities, required thickness, etc. Drawing the SAR on the SARD may comprise the following actions: create SAR; lay SAR; and adhere SAR on the surface of the SARD's body. The drawing of the SARs may be done in a continuous motion, in a segmented motion, and/or a combination of both motions. The flexible material of the SARs ingredients and the ratio between them may influence the different attributes of the flexible material. Exemplary ingredients may include: different polymers, silica, ceramics, fillers, fiber, etc. Exemplary ratios of combinations of different ingredients may be for UV curing (i.e., see tables 1, and 2) and for thermal curing (i.e., see tables 3, 4 and 5):

TABLE 1

| Ingredient | % Weight | Exemplary supplier |
| --- | --- | --- |
| SPF 918 | 81.4 | RAHN |
| AEROSIL R-972 | 13.0 | EVONIK |
| Genocure LTM | 2.8 | RAHN |
| Genocure LBC | 2.8 | RAHN |

TABLE 2

| Ingredient | % Weight | Exemplary supplier |
| --- | --- | --- |
| SPF 918 | 80.9 | RAHN |
| AEROSIL R-812 | 13.5 | EVONIK |
| Genocure LTM | 2.8 | RAHN |
| Genocure LBC | 2.8 | RAHN |

TABLE 3

| Ingredient | Weight | Exemplary Supplier |
| --- | --- | --- |
| U-1050 | 100 | Polymer Gvulot |
| EPC-238 | 34-45 | Polymer Gvulot |
| AEROSIL R-972 | 100 | EVONIK |

TABLE 4

| Ingredient | Weight | Exemplary Supplier |
| --- | --- | --- |
| U-233 | 100 | Polymer Gvulot |
| EPC238 | 34-45 | Polymer Gvulot |
| CabOsil M5 | 24 | CABOT |

TABLE 5

| Ingredient | Weight | Exemplary Supplier |
| --- | --- | --- |
| U-233 | 100 | Polymer Gvulot |
| EPC238 | 34-45 | Polymer Gvulot |
| Aerosil R-812 | 24 | EVONIK |

In some embodiments the flexible material of the SAR may be: thermoplastic polymers, thermosetting polymers, metal, a combination of them, and so on. Exemplary flexible material may comprise: Polyurethane, having a hardness of 60-99 shore A, preferably, 80-99 shore A or Polypropylene, etc. Optionally, the viscosity of the material as deposited (drawn) may be between 1,000 cps and 145,000 cps, preferably between 17,000 cps and 80,000 cps, etc.

Yet in some embodiments, the SAR may be a cutting SAR. According to these embodiments, the edges of the SAR may be milled (scraped) in order to form a sharpened edge adapted for cutting, for example. The milling may be done by mechanical or optical equipment. In these embodiments, the SARs may be have a hardness of 85 shore A and more or 35 shore D and more. Exemplary materials that may be used are: polymers loaded with glass fiber, carbon fiber, Kevlar fiber or fillers like silica, metal, carbon black etc.

In exemplary embodiments, the SAR (surface-adhesive rule) profile/shape may comprise different attributes. Exemplary attributes of the SAR cross-section may be: a wide base, a non-symmetrical shape, a cone shape, straight shape, and different combination of them. The shape and attributes of the SAR may be determined according to different required parameters. These parameters may include, but are not limited to: the layout of the surface-adhesive-rule die (SARD); the distance between different SARs; the direction from which harsh forces will strike the SARs; the adhesive requirements; etc. The SART (surface-adhesive-rule technology) may enable the SARs to have non-standard sizes if required.

In exemplary embodiments, including some of the embodiments described in the present disclosure, the surface-adhesive-rule die's (SARD) body may be made of flexible film. The flexible film may include one or more types of polymers. Exemplary polymers that may be used include, but are not limited to: polyester, polyamide, polycarbonate, and/or a combination of these polymers or others. Furthermore, the flexible film may include one or more additives. These additives may include, but not limited to: silica, ceramics, metal, different fillers, etc. Exemplary embodiments of the flexible film may comprise several layers (co-layers). Each layer may be constructed of a different material.

The surface-adhesive-rule die's (SARD) body may be associated with, connected to, or joined with a substrate made from material other than flexible film. Materials such as, but not limited to, metal, wood, etc. Furthermore, the surface-adhesive-rule die's (SARD) body may have a flat shape, cylindrical shape or any other shape. In addition, the SARD's body may be flexible such that it can change its shape, for example from flat to cylindrical so it can be wrapped around a drum, for example.

The flexible film of the SARD's body may have a strong enough sustainability, firmness, inside-cohesion, robustness, and/or lifespan to withstand the pressures and harsh operation which can be around a few ton press force (1-10 ton, for example) in one or more directions during the cutting/creasing/embossing operation of the cardboards. In other exemplary embodiments, the SARD's body may be made of material other then flexible film, and/or a combination of them. Furthermore, the surface-adhesive-rule technology enables working without the need of ejection (rebound) rubber around the surface-adhesive rule. Advantageously, this aspect of the various embodiments saves time, money, and rubber material.

The surface-adhesive-rule technology may comprise a novel flexible surface-adhesive-rule counter die (SARCD). The SARCD body may comprise flexible-counter film. The flexible-counter film may include one or more types of polymers. Exemplary polymers that may be used include, but are not limited to: polyurethane, EPDM (ethylene propylene diene Monomer rubber), NBR (Nitrile butadiene rubber), acrylic rubber, silicone rubber, SBR (Styrene-Butadiene-Rubber) etc. Furthermore, the flexible-counter film may include one or more additives. These additives may include, but not limited to: silica, ceramics metal, fillers, various fibers, slip agent, carbon black, talc, etc. Exemplary embodiments the flexible-counter film may comprise several layers. Each layer may be made of different materials.

The surface-adhesive-rule counter die's (SARCD) body may be associated with, joined to or connected to a material other then the flexible-counter film. These materials may include, but not limited to metal, wood, PET (Polyethylene terephthalate) film, sponge material (with open or closed cells), etc. For example, the flexible-counter films may be associated with, joined to or connected to a sponge material, and the sponge material may be associated with, joined to or connected on its other side to a PET (Polyethylene terephthalate) film base, and so on. Furthermore, the surface-adhesive-rule counter die's (SARCD) body may have a flat, cylindrical or any other shape. In addition, the SARCD's body may be flexible such that it can change its shape, for example from flat to cylindrical so it can be wrapped around a drum, for example. The flexible-counter film may have a strong enough sustainability, firmness, inside-cohesion, robustness, and/or lifespan to withstand pressure and harsh operation. The surface-adhesive-rule counter die's (SARCD) may be supplied/sold as a SARCD body, and/or as a SARCD body associated with, joined to or connected to a drum or a flat base. As a non-limiting example, the SCARD body associated with a flat or drum base by molding, coating, attachment by grippers, etc.

The flexible-counter film may have additional attributes. Examples of these additional attributes may include, but are not limited to: flexibility, required thickness, resilience, required hardness, dimension stability, coefficient of friction, sustainability, inside-cohesion, robustness, life span, sponge attribute, wear-out resistance, etc. Exemplary surface-adhesive-rule counter die (SARCD) may have a body that is comprised of a flexible-counter film made of polyurethane at a thickness of a few mm (1.1-3.7 mm, as a non-limiting example) with a hardness of a few tens of shores (20-70 shore, as a non-limiting example).

Exemplary embodiments of the flexible-counter film may be comprised of several layers. Each layer of the flexible-counter film may be made from or comprise different ingredients. Further, each layer of the flexible-counter film may have different attributes. As a non-limiting example, the lowest or bottom layer may be comprised of a material with attributes that: have a high friction coefficient, are tacky, have an affinity, and/or include a degree of firmness. Further, the highest or top layer of the flexible-counter film may be comprised of a material with attributes that: have a high resilience, have a degree of flexibility, and/or are resistant to wearing out.

Even further, an intermediate layer of the flexible-counter film may be comprised of a material with attributes that provide sponginess or compression, etc. In some exemplary embodiments, the flexible-counter film may also be comprised of a lattice with a pre-defined density of one or more different fibers. Exemplary fibers in the lattice may include, but are not limited to, metal fibers, carbon fibers, etc. In other exemplary embodiments, the flexible-counter film may be notched. The notches may be made in a variety of manners such as but not limited to by a laser.

The SARCD flexible-counter film's ingredients and the ratio between them may influence the different attributes of the flexible film. Exemplary ingredients may include, but are not limited to: different polymers, silica, ceramics, fillers, fiber etc.

The surface-adhesive-rule technology (SART) may provide a novel surface to the flexible surface-adhesive-rule counter die's body (SARCD). In exemplary embodiments, the surface of the flexible SARCD's body may be a blank surface. A blank surface may be defined as a surface with no trenches or pattern/layout. The flexible-counter film may be such that it adapts itself to the SAR (surface-adhesive rule) that it will encounter. This characteristic has the advantage of alleviating the need for resources and time that is required in the creation of trenches on a counter-die.

Further, the surface of the flexible surface-adhesive-rule counter die's (SARCD) body may return to a blank surface after the dies (SARD and SARCD) detach from each other (resilience attribute). Thus, the flexible SARCD may be used for different surface-adhesive-rule dies (SARD). This characteristic that can be employed in various embodiments also results in reducing the cost and production time for the SARCD. In other exemplary embodiments, the SARCD material may remember the pattern/layout due to the press, this attribute may be achieved using thermoplastic material, for example.

In alternate exemplary embodiments, the surface of the flexible SARCD body may include one or more trenches. The trenches may be created using a variety of different techniques. Exemplary techniques for creating the trenches may comprise: using a laser, drawing negative, extrusion, gnawing, molding, coating, etc. The SARCD may also be created using a variety of different techniques. Techniques for creating the SARCD may include, but not limited to: molding, coating, press/injection molding, a combination of them, etc. More information on the different techniques of creating the SARCD is disclosed below in conjunction with the description of FIGS. 16-18.

The surface-adhesive-rule technology (SART) enables a user to create a fine crease in the cardboard. This has been experimentally tested and verified by the applicants. The creases achieved by use of the SART exceed current industry standards and as such, it may result in creating a new and higher (finer) standard. Furthermore, the SART improves the quality of the pre-treated cardboard crease's surface. These improvements may include significantly reducing the number and severity of ply-cracks, for example. Thus, the SART performs at a level that exceeds the present industry capabilities and standards.

In addition, the SART allows for new shapes of packages to be created and at a higher aesthetic quality. This also has been experimentally tested and verified by the applicants. The SART enables a user to create new and different shapes of creasing/cutting/embossing and different alignment of the creasing/cutting/embossing on the cardboard. For example, the SART enables: the pre-treated creasing to be much more refined; reduces ply-cracks and reduces the tearing of the cardboard; etc.

The flexible film of the SARD's body and/or the flexible-counter film of the SARCD's body, may be relatively immune to a changes in room parameters and over a wider range of room parameters. For instance, SARD's body and/or SARCD's body provide consistent results when room parameters such as, but not limited to, temperature, humidity, light, etc. vary or over a wide range of these parameters.

In exemplary embodiments of the present disclosure, the surface-adhesive rules (SAR) may be bonded to the surface of the flexible surface-adhesive-rule die's body by adhesion. Exemplary adhesion techniques may include, but are not limited to, using an intermediated-adhesive material between the SAR and the flexible SARD body's surface. The intermediated adhesive material used may include, but is not limited to: adcote 811 of DOW company, 238A+ catalyst of MORCHEM company, etc. Other exemplary embodiments of adhesion may be achieved by adhesive attributes of the SAR and the surface of the flexible SARD's body materials. Yet, in other exemplary embodiments, a combination of these two, as well as other techniques may be implemented. Adhesive attributes may include, but are not limited to: epoxy, oligomer, silicone acrylate oligomer, adhesion promoter, photoinitiator.

Exemplary embodiments of the present disclosure provide a method and system for bonding the SARs to the surface of the flexible SARD's body during the course of making the surface-adhesive-rule die (SARD) with the creation of its surface-adhesive rules (SAR) simultaneously. The surface adhesive method and system may comprise: one or more pre-adhesive-treatment methods and systems; one or more adhesive substances; one or more adhesive spreading/laying of the adhesive substances; one or more curing techniques; one or more post-adhesive-treatments; and so on.

The type of the surface adhesive method and system utilized may be determined based on a variety of parameters. These parameters may include, but are not limited to: the SAR material; the material of the surface of the SARD's body; the combination of the SAR material and the material of the surface of the SARD's body; time requirements of the surface-adhesive-rule technology (SART); and so on.

Different pre-treatment(s) may be done or applied before drawing SARs. Exemplary pre-treatments that can be applied prior to the drawing may include, but are not limited: different primers and primer techniques; Ozone-shower; high voltage electric cord; electron beam; plasma; flaming, etc. In exemplary embodiments, illuminating the flexible SARD's body with UV light can be performed as a pre-treatment before laying and adhering the surface-adhesive rules (SAR), for example.

In an exemplary embodiment, the intermediated-adhesive material may be placed, spread, sprayed, coated, painted or otherwise placed onto the surface of the flexible SARD body before the laying of the SARs. In an alternate embodiment, the intermediated-adhesive material may be placed, spread, sprayed, painted or otherwise placed on the surface of the flexible SARD's body during the drawing of the SARs. The intermediated-adhesive material may be placed, spread, sprayed, painted or otherwise placed on the surface of the flexible SARD's body in different methods and systems. Exemplary methods and systems may be: spreading the intermediated-adhesive material by an application head associated with or controlled by a leading mechanism.

The novel surface-adhesive-rule technology (SART) enables a complete surface-adhesive-rule die (SARD) to be automatically created, while simultaneously drawing its plurality of surface-adhesive rules (SARs). Exemplary embodiments of the system and method of the surface-adhesive-rule technology may include a rule-drawer.

The rule-drawer may operate to automatically draw the surface-adhesive rules (SARs) onto the surface of the flexible surface-adhesive-rules die (SARD) at the desired locations. The process of drawing the rules may comprise one or more of the following actions: create the SAR; lay the SAR; adhere the SAR onto the surface of the SARD's body. The drawing of the SARs may be done in a continuous motion, in a segmented motion, and/or a combination of both motions as well as a variety of other techniques.

An exemplary embodiment of a rule-drawer may comprise: one or more drawing-heads, a controller, and a leading mechanism. The drawing-head may be an automatic drawing-head associated with the leading mechanism. The leading mechanism, under the control of the controller may operate to move elements of the drawing-head to different locations and in different directions, for example. The leading mechanism may be a mechanical arm, one or more rails, etc. The controller may control the drawing head as well as the leading mechanism, for example. For instance, the controller may operate to cause the leading mechanism to move the drawing head to a desired location, then trigger the drawing head to begin drawing.

The controller may be integral to a computer (such as software, firmware etc. Software may be embodied on a computer readable medium such as a read/write hard disc, CDROM, Flash memory, ROM, or other memory or storage, etc. In order to execute a certain task a software program may be loaded to an appropriate processor as needed) or operated by a computer, for example. As a non-limiting example of the controller being integral to a computer, the computer may be loaded with a job description. The job description may include: the type of the surface-adhesive rules (SAR), the type and thickness of the cardboard, the layout of the surface-adhesive-rule die (SARD), etc. The layout of the SARD may include, the placement of each SAR and its type, for example. According to the layout of the SARD, the controller may command and automatically control the leading mechanism of the rule-drawer for drawing the SARs on the SARD's body. The controller may control other modules of the surface-adhesive-rule technology (SART). Thus, exemplary embodiments of the present disclosure may include the above-described novel method and system of creating an automatic direct-computer-to-die (DCTD) surface-adhesive-rule technology (SART).

The computer of the SART may further comprise a stored look-up table. The stored look-up table may comprise different information. Exemplary information may include, but is not limited to: information regarding the surface-adhesive rule's profile according to required cardboard thickness; the required cardboard length; the cardboard coefficient of friction (COF); the information regarding the required ingredients for the flexible material for a required cardboard; the information regarding the required ingredients for the flexible material for a required function (cutting/creasing/embossing); the profile of SAR; the nozzle type; and so on.

In an exemplary embodiment, the drawing-head or drawing-heads of the rule-drawer may comprise a cartridge. Although the description may refer to a single drawing-head, it should be appreciated that in various embodiments, more than one drawing head may be utilized. The cartridge of the drawing-head may contain flexible material. The drawing-head may further comprise a nozzle with one or more predefined orifice shapes. The orifice shapes may be selected according to a required profile of the surface-adhesive rules (SAR), for example. The drawing-head may further comprise a pressure-actuator. The pressure-actuator may be used to dispense the flexible material out of the cartridge and through the nozzle's orifice toward the required placement on the surface of the die's body thereby creating the surface-adhesive rule and die.

The pressure-actuator employed in various embodiments may be of different types. Exemplary types of the pressure-actuator may include, but are not limited to: an air-pump actuator, a screw-pump actuator, a piston actuator, an electrical pump actuator, a cogwheel actuator, an inject actuator etc. Exemplary embodiments of a pressure-actuator may comprise a combination of one or more types of actuators. There may be one or more pressure-actuators associated with one or more modules of the rule-drawer, for example. In exemplary embodiments, the pressure-actuator may have suction capabilities or functionality as well.

The nozzle of the drawing-head may have one or more orifices. The orifice may determine the surface-adhesive rule profile/shape or may be selected to obtain a desired profile/shape. The orifice may be located at the bottom of the nozzle, at the side of the nozzle, on an edge of the nozzle, or a combination of multiple placements, etc. In exemplary embodiments, the nozzle may be quickly and easily disassembled or detached from the drawing-head and a different nozzle may be assembled or attached to the drawing-head. The inside of the nozzle and/or orifice may have a coating that operates to reject or repel the flexible material. Advantageously, this characteristic helps to prevent clogging or blockage, either partial or complete, of the orifice. The shape and placement of the orifice may be determined according to different criteria. Exemplary criteria may include, but is not limited to: adhesive requirements of the SAR to the surface of the SARD's body; the drawing-termination technique used; the required surface-adhesive rule profile; and so on.

During the drawing of a SAR the nozzle may be placed at a predefined angle and height from the surface of the SARD's body, according to commands from the controller, for example. The angle and height of the nozzle may be determined according to different criteria. Exemplary criteria may include, but is not limited to: orifice location; the flexible material of the SAR; the distance from an adjacent SAR; and so on. In exemplary embodiments, the angle and height may change during the drawing of the SARs. In exemplary embodiments, the flexible material may be ejected from the orifice in a "spitting" manner, near a corner for example.

The cartridge may be implemented in a variety of techniques. An exemplary embodiment of a cartridge may be a cylindrical shape with a specific volume capacity (e.g. 30-800 cc volume). In an alternate embodiment, the cartridge may be in a predefined shape, similar to the shape of the nozzle's orifice, for example. Further, in exemplary embodiments, the cartridge may be associated with or fed from a larger volume container, which can load the cartridge with flexible material at predefined times, continuously and/or when needed. In exemplary embodiments, a mixer may be associated with the cartridge. The mixer may mix the flexible material inside the cartridge at predefined times, continuously and/or when needed. The mixer may further comprise a heater, for example.

The inside of the cartridge may have a coating that operates to reject or repel the flexible material. Advantageously, this characteristic promotes to flow of the flexible material toward the nozzle. In exemplary embodiments, there may be one or more cartridges working together on the drawing of a SAR, or on the creation of different SARs, and so on. An exemplary embodiment of a multiple-compartments cartridge may contain, separately, one or more ingredients of the flexible material. In an alternate embodiment, each compartment may comprise a different flexible material, for a different layer of the co-layer, for example.

In alternate embodiment the co-layer may be created in phases. It should also be appreciated than in some embodiments, a bank of cartridges may utilized to house different ingredients and flexible materials and, the controller or rule-drawer may operate to select one or more ingredients to be mixed, or different materials to be ejected through the nozzle depending on the particular requirements. For example, cartridges may include various additives that can provide different characteristics to the materials being applied. If quick drying is required in a particular application, additives may be pulled from a cartridge that may provide such a characteristic. Likewise, different pigmentations can be utilized, different levels of viscosity, etc., can be obtained in real time by the controller controlling the volume of particular additives or substances from the cartridges. In some embodiments, a heating element may also be utilized to heat the content of the cartridges to a desired temperature.

The cartridge may further comprise a combiner. In exemplary embodiments, the combiner may combine the different ingredients and/or flexible material, for example. The combiner may comprise a slot or an aperture through which the combined material may be output. The controller of the rule-drawer for example, may control the quantities of each component, for example. This can be accomplished in a variety of manners such as controlling the flow-rate from a cartridge by adjusting the size of an opening valve from the cartridge, the amount of pressure applied to the cartridge, etc.

In an exemplary embodiment, the drawing-head may further comprise one or more adhesive-cartridges and an adhesive-nozzle that may spread/spray adhesive substance on the required areas.

In exemplary embodiments the controller, of the rule-drawer for example, may be responsible to control and synchronize the velocity of the-leading mechanism of the rule-drawer to the placement and phase of the SAR drawing process. For example, at the beginning of the drawing of the surface-adhesive rule, the velocity of the leading mechanism may be slower than the velocity at the middle of the drawing of the surface-adhesive rule.

In some embodiments, the controller may be responsible for controlling and synchronizing the amount of pressure to be imposed by the pressure-actuator on the flexible material according to the placement and phase of the SAR drawing process. For example, at the beginning of the drawing of the surface-adhesive rule less pressure may be imposed then the imposed pressure at the middle of the drawing of the surface-adhesive rule.

In exemplary embodiments, the controller may be responsible for controlling and/or synchronizing the amount of pressure to be imposed by the pressure-actuator and the velocity of the leading mechanism according to a flow index of the flexible material. The flow index may be the amount of flexible material that is output through the nozzle's orifice at a predetermined time with a predetermined pressure, for example. The flow index may be influenced by the different attributes of the flexible material. Attributes such as, but not limited to: viscosity, thickness, tackiness, size of particles, a combination of any of these attributes as well as others.

In an exemplary embodiment, the leading mechanism may move in a plurality of directions on one or more axes. For instance, the leading mechanism may move in multiple directions along the X, Y and/or Z axes. In an alternate embodiment, the leading mechanism may move only along two axes, such as the X and Y axes. Exemplary embodiments of the surface-adhesive-rule technology may further comprise a conveyor on which the body of the SARD is associated with during the process. The conveyor may move in multiple directions along one or more axes and/or in a circular direction, for example. The controller may control the conveyor velocity and direction of movement, for example. In an alternate embodiment, the surface-adhesive-rule technology may further comprise a drum on which the SARD may be positioned. The controller may control the drum velocity and direction of movement, for example. Further, it will be appreciated that a combination of a moving leading mechanism for moving the drawing-head and a mechanism for moving the SARD may be employed. For instance, the leading mechanism may move the drawing head in multiple directions on the X axes while the conveyor moves the SARD in multiple directions on the Y axes. Other combinations are also anticipated.

Exemplary embodiments of the present disclosure may further implement different hardening techniques. The hardening techniques may include, but are not limited to: temperature treatment, light curing (UV, IR, visible light), chemical curing, etc. In some exemplary embodiments, the flexible material may comprise thermosetting polymers and may be hardened by heating, for example. Alternatively or additionally, the flexible material may comprise thermoplastic polymers and hardening of the flexible material may be accomplished by cooling the material, for example. Some flexible materials may include photo-initiator ingredients that enable curing by UV illumination, for example. In other exemplary embodiments, the material may be cooled or harden by itself. In yet other exemplary embodiment, the flexible material may be hardened by electron beam.

Exemplary embodiments of the present disclosure may comprise a method and apparatus that will isolate the flexible material that has not yet been placed (in the cartridge and nozzle, for example) from the origin of the hardening energy. A divider may be placed between the origin of the hardening energy and the cartridge/nozzle at the time of hardening, for example.

In some exemplary embodiments, the rule-drawer may further comprise a flow-intermissioner. The flow-intermissioner may be passive, active, or a combination of both. The flow-intermissioner may be implemented as an apparatus, a method, or a combination of both. The flow-intermissioner may, when required, stop/pause the output of the flexible material during the drawing of the surface-adhesive rules. The controller may control the operation of the flow-intermissioner. Exemplary embodiments of the flow-intermissioner may be implemented as different shutters. There may be one or more shutters. The shutter may be associated with one or more modules of the rule-drawer. Exemplary shutters may include, but are not limited to: a knife, an air-knife, a plug, a stopper, etc.

Exemplary embodiments of a flow-intermissioner may include a method in which the nozzle is spun sharply around its center while the pressure-actuators stop outputting the flexible material, for example. The method may further comprise adding certain ingredients that will accelerate the breaking/cutting of the flexible material (brittle attribute) at the moment of required termination. Exemplary ingredients may include, but are not limited to: silica, air bubbles, water drops, etc. Other embodiments may implement suction actions.

The surface-adhesive-rule technology (SART) may further comprise a self-maintained-cleaning mechanism. The self-maintained-cleaning mechanism may be a part of the rule-drawer, such as an additional cartridge that stores cleaning material, for example. In other exemplary embodiments, the self-maintained-cleaning mechanism may be external to the rule-drawer. The self-maintained-cleaning mechanism may work at pre-defined times and/or when needed.

Other exemplary embodiments of the surface-adhesive-rule technology (SART) may be implemented using magnetic forces. Exemplary methods of constructing a die may be by bonding SARs to the body of the SARD by magnetic forces. In some embodiments, small pieces of magnetic material may be deposit on the SARD's body and attracted to it by magnetic force. An adhesive may be added between the magnetic material and body. Exemplary sizes of the pieces of the deposited magnetic material, may be about 1 mm on each side, for example. The pieces of material may be deposited adjacent to each other, so as to form a desired layout of SARs. In some embodiments, the SARD body may include a magnetic force only on the desired layout, for example. Exemplary peel strength between the pieces of material and the body may be about 13 gr/mm$^2$.

Yet other exemplary embodiments of the SART (surface-adhesive-rule technology) may be implemented by coating the surface of the SARD's body with a low surface tension material and the locations where SARs are to be formed are coated with a high surface tension material. The flexible material may be deposited onto the body of the die. Due to the high surface tension material at the locations of the SARs, the flexible material may coalesce from the low surface tension areas to the high surface tension areas. This characteristic creates surface-adhesive rules at the desired locations. Optionally, the material may be deposited only on areas surrounding the high surface tension areas. In some embodiments, the SARs may then be hardened and/or adhered to the die.

Unless otherwise defined, all technical and/or scientific terms used herein have the same meaning as commonly understood by one of ordinary skill in the art to which the disclosure pertains. In case there is a conflict in the definition or meaning of a term, it is intended that the definitions presented within this specification are to be controlling. In addition, the materials, methods, and examples that are presented throughout the description are illustrative only and are not necessarily intended to be limiting.

Reference in the specification to "one embodiment" or to "an embodiment" means that a particular feature, structure, or characteristic described in connection with the embodiment is included in at least one embodiment of the disclosure, and multiple references to "one embodiment" or "an embodiment" should not be understood as necessarily referring to the same embodiment or all embodiments.

Implementation of the method and/or system of embodiments of the disclosure can involve performing or completing selected tasks manually, automatically, or a combination thereof. Moreover, according to actual instrumentation and equipment of embodiments of the method and/or system of the disclosure, several selected tasks could be implemented by hardware, by software or by firmware or by a combination thereof and with or without employment of an operating system. Software may be embodied on a computer readable medium such as a read/write hard disc, CDROM, Flash memory, ROM, etc. In order to execute a certain task, a software program may be loaded into or accessed by an appropriate processor as needed.

These and other aspects of the disclosure will be apparent in view of the attached figures and detailed description. The foregoing summary is not intended to summarize each potential embodiment or every aspect of the present disclosure, and other features and advantages of the present disclosure will become apparent upon reading the following detailed description of the embodiments with the accompanying drawings and appended claims.

Furthermore, although specific embodiments are described in detail to illustrate the inventive concepts to a person of ordinary skill in the art, such embodiments are susceptible to various modifications and alternative forms. Accordingly, the figures and written description are not intended to limit the scope of the inventive concepts in any manner.

BRIEF DESCRIPTION OF THE DRAWINGS

Exemplary embodiments of the present disclosure will be understood and appreciated more fully from the following detailed description, taken in conjunction with the drawings in which.

DETAILED DESCRIPTION OF EXEMPLARY EMBODIMENTS

Turning now to the figures in which like numerals and/or labels represent like elements throughout the several views, exemplary embodiments of the present disclosure are described. For convenience, only some elements of the same group may be labeled with numerals. The purpose of the drawings is to describe exemplary embodiments and is not for production purpose. Therefore features shown in the figures are for illustration purposes only and are not necessarily drawn to-scale and were chosen only for convenience and clarity of presentation.

Figure 1A:
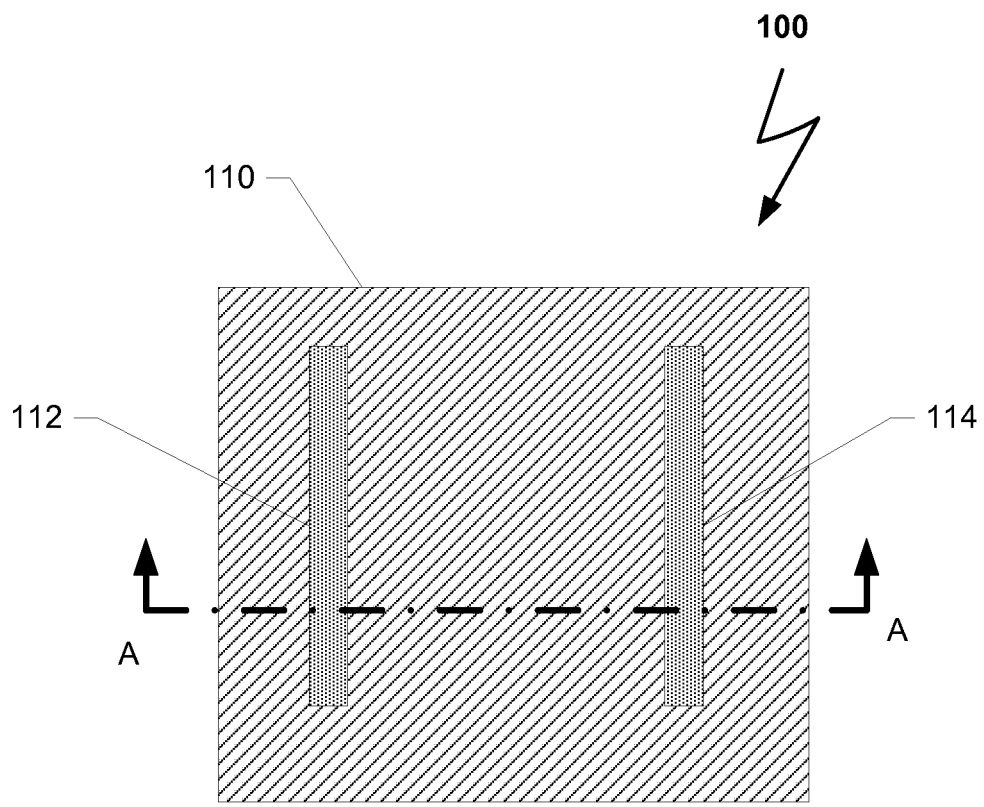
FIGS. 1a-b are simplified block diagrams illustrating an exemplary portion of a prior art die.

FIG. 1a depicts a block diagram with relevant elements of an exemplary common prior art steel-rule die 100. Steel-rule die 100 may comprise a body 110, and a plurality of steel-rules: steel-rule 112 and steel-rule 114, for example. Steel-rules 112 and 114 may be cutting rules, creasing rules, embossing rules, etc. The body 110 may be made of hardwood material, for example.

Figure 1B:
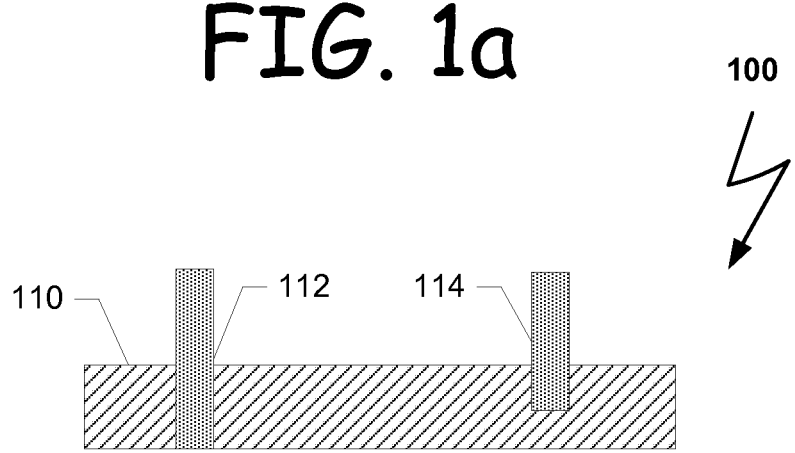

FIG. 1b depicts cross-sectional view of the exemplary prior art steel-rule die 100 of FIG. 1a taken at line A-A. Steel-rule 112 may be jammed deeply inside the body 110 of the steel-rule die, even extending to the point that is all the way through the body 110. Steel-rule 114 may be jammed inside part of the steel-rule die's body 110.

Figure 2A:
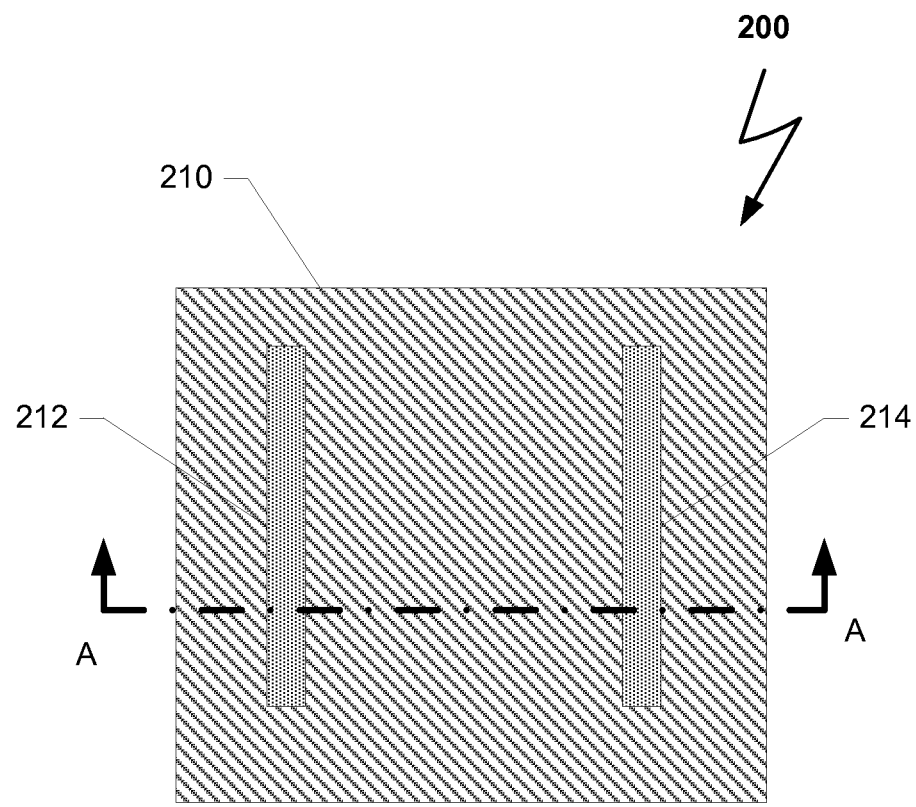
FIG. 2a-b are schematic illustrations of simplified block diagrams with relevant elements of an exemplary surface-adhesive-rule die (SARD), according to exemplary teaching of the present disclosure.

FIG. 2a schematically illustrates a simplified portion of a block diagram with relevant elements of an exemplary surface-adhesive-rule die 200 (SARD). The surface-adhesiverule die 200 (SARD) may comprise a body 210, and a plurality of surface-adhesive rules (SAR): SAR 212 and SAR 214, for example. Surface-adhesive rules (SAR) 212 and 214 may be of different types. Exemplary SAR types may be: cutting SAR; creasing SAR; embossing SAR; etc. Henceforth, throughout the description, drawings and claims of the present disclosure the terms cutting SAR, creasing SAR, embossing SAR, etc. may be used interchangeably and the term SAR used by itself may refer to any of these types.

SAR 212 and SAR 214 may be made of flexible material, for example. The flexible material may be gel or liquid like material. The flexible material may include one or more different types of polymers and/or different combinations of polymers. Exemplary polymers that may be used include, but are not limited to: polyester, polyamide, polycarbonate, polyurethane, acrylic, polypropylene, polyethylene, etc. Furthermore, the flexible material may include one or more additives. The additives may include, but are not limited to: silica, ceramics, metal, various fibers, different fillers, etc. Exemplary embodiments SAR may comprise several layers (co layer), and each such layer be constructed from a different material or, one or more layers may be constructed from different material.

The exemplary SAR 212 and SAR 214 may have a strong enough sustainability, firmness, inside-cohesion, robustness, and/or lifespan to withstand the pressure and harsh operation of high pressure press force in one or more directions on the SAR during the cutting/creasing/embossing operation of numerous cardboards. The pressure press force may be around a few tons. 1-10 ton pressure press force, for example.

The flexible material may have additional attributes as well. Exemplary attributes may include, but are not limited to: flexibility, tackiness, spreading capabilities, required thickness, etc. Different ingredients in the flexible material, and the ratio between these ingredients influence the presence and/or ranges of the different attributes. Exemplary ingredients may include, but are not limited to: different polymers, silica, ceramics, fillers, fiber etc. Exemplary ratios in the combinations of different polymers, silica, ceramics, fillers are illustrated in the following tables:

TABLE 1

| Ingredient | % Weight | Exemplary supplier |
|---|---|---|
| SPF 918 | 81.4 | RAHN |
| AEROSIL R-972 | 13.0 | EVONIK |
| Genocure LTM | 2.8 | RAHN |
| Genocure LBC | 2.8 | RAHN |

TABLE 2

| Ingredient | % Weight | Exemplary supplier |
|---|---|---|
| SPF 918 | 80.9 | RAHN |
| AEROSIL R-812 | 13.5 | EVONIK |
| Genocure LTM | 2.8 | RAHN |
| Genocure LBC | 2.8 | RAHN |

TABLE 3

| Ingredient | Weight | Exemplary Supplier |
|---|---|---|
| U-1050 | 100 | Polymer Gvulot |
| EPC-238 | 34-45 | Polymer Gvulot |
| AEROSIL R-972 | 100 | EVONIK |

TABLE 4

| Ingredient | Weight | Exemplary Supplier |
|---|---|---|
| U-233 | 100 | Polymer Gvulot |
| EPC238 | 34-45 | Polymer Gvulot |
| CabOsil M5 | 24 | CABOT |

TABLE 5

| Ingredient | Weight | Exemplary Supplier |
|---|---|---|
| U-233 | 100 | Polymer Gvulot |
| EPC238 | 34-45 | Polymer Gvulot |
| Aerosil R-812 | 24 | EVONIK |

In some embodiments the flexible material of the SAR may be: thermoplastic polymers, thermosetting polymers, metal, a combination of them, and so on. Exemplary flexible material may comprise: Polyurethane, having a hardness of 60-99 shore A, preferably, 80-99 shore A or Polypropylene, etc. Optionally, the viscosity of the material as deposited (drawn) may be between 1,000 cps and 145,000 cps, preferably between 17,000 cps and 80,000 cps, etc.

Yet in some embodiments, the SAR may be a cutting SAR. According to these embodiments, the edges of the SAR may be milled in order to form a sharpened edge adapted for cutting, for example. The milling may be done by mechanical or optical equipment. In these embodiments, the SARs may be have a hardness of 85 shore A and more or 35 shore D and more. Exemplary materials that may be used are: polymers loaded with glass fiber, carbon fiber, Kevlar fiber or fillers like silica, metal, carbon black etc.

The exemplary body 210 of the surface-adhesive-rule die (SARD) 200 210 may be made of or comprise a flexible film. The flexible film may include one or more types of polymers. Exemplary polymers that may be used include, but are not limited to: polyester, polyamide, polycarbonate, and/or a combination of one or more of these polymers as well as other polymers and non-polymers. Furthermore the flexible film may include one or more additives. The additives included in the flexible film may include, but are not limited to: silica, ceramics, metal, different fillers, etc. Exemplary embodiments of the flexible film may have one or more layers and, each layer may utilize or contain a different material than one or more of the other layers. In some exemplary embodiments, the flexible film may be a commercial one.

Exemplary flexible films that may be used in the body 210 of a surface-adhesive-rule die 200 (SARD) may include, but are not limited to: PET (Polyethylene terephthalate), PA (Polyamide), polypropilen, stainless steel, Aluminum (Al) and/or a combination of one or more of these materials as well as others. Exemplary suppliers for such materials are: HANITA Company (an Israeli company), SKC Company, ALCAM VAW Company, etc. Some exemplary embodiments of the body 210 of the surface-adhesive-rule die 200 (SARD) may be comprised of a combination of two or more flexible films. Exemplary combinations may include, but are not limited to: 23 micron thickness of PET associated to 25 micron thickness of Al; and/or 25 micron thickness of PET associated to 25 micron thickness of Al; and/or 36 micron thickness of PET associated to 45 micron thickness of PA; and/or 23 micron thickness of PET associated to 15 micron thickness of PA and 18 micron thickness of Al; etc.

The body 210 of the SARD may be associated with, adhered to or otherwise combined with a substrate made of material other then flexible film. These other materials may include, but not limited to: metal, wood, plastic, etc. Furthermore, the body 210 of the SARD may have a flat, cylindrical or other shape. In addition, the body 210 of the SARD may be flexible such that it's shape can be n changed, for example from flat to cylindrical to be wrapped around a drum, for example.

The body 210 of the SARD may have a strong enough sustainability, firmness, inside-cohesion, robustness, and/or lifespan to withstand the pressure and harsh operation which can be around a few tons of press force (1-10 ton, for example) in one or more directions during the cutting/creasing/embossing operation of the cardboards. In other exemplary embodiments, the body 210 of the SARD may be made of material other then flexible film, and/or a combination of various materials.

The flexible film may have additional attributes such as being flexible, tacky, spreadable, meeting required thicknesses, etc. Different ingredients in the flexible film, and the ratio between these ingredients influence the ratio or the characteristics of the different attributes. Exemplary ingredients may include, but are not limited to: different polymers, silica, ceramics, fillers, fiber etc.

Figure 2B:
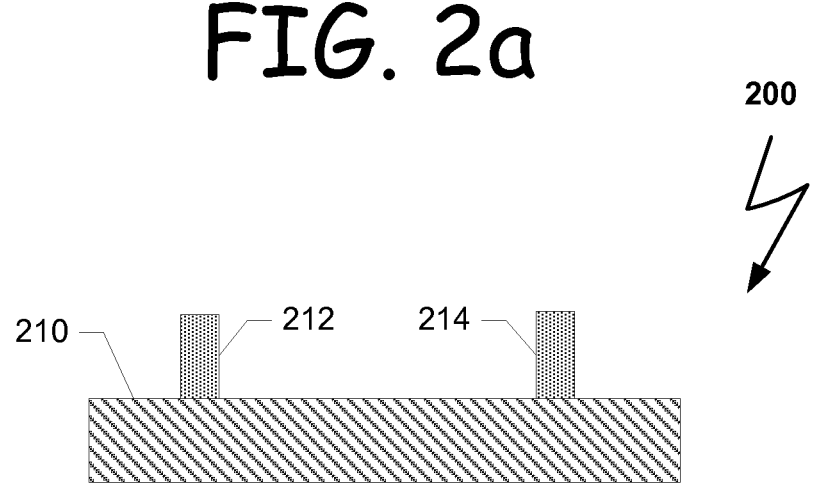

FIG. 2b depicts a cross-sectional view of the exemplary surface-adhesive-rule die 200 (SARD) taken at line A-A. Exemplary SAR 212 and SAR 214 may be bonded to the surface of the body 210 of the SARD by adhesion. Exemplary adhesion techniques may include using an intermediated-adhesive material between the SAR (212 and/or 214) and the surface of the body 210 of the SARD. Intermediated adhesive materials may include, but are not limited to: adcote 811 of DOW company, 238A+ catalyst of MORCHEM company, etc. Other exemplary embodiments of adhesion may be achieved by adhesive attributes of the SARs 212 and 214 materials and the materials used in the body 210 of the SARD. Adhesive attributes may include, but are not limited to: epoxy, oligomer, silicone acrylate oligomer, adhesion promoter, photoinitiator. In some embodiments, the bonding may be done by hardening, such as thermal curing, chemical curing, UV curing, etc. Yet in other exemplary embodiments a combination of the two or more techniques may be implemented and other techniques are also anticipated.

Figure 3A:
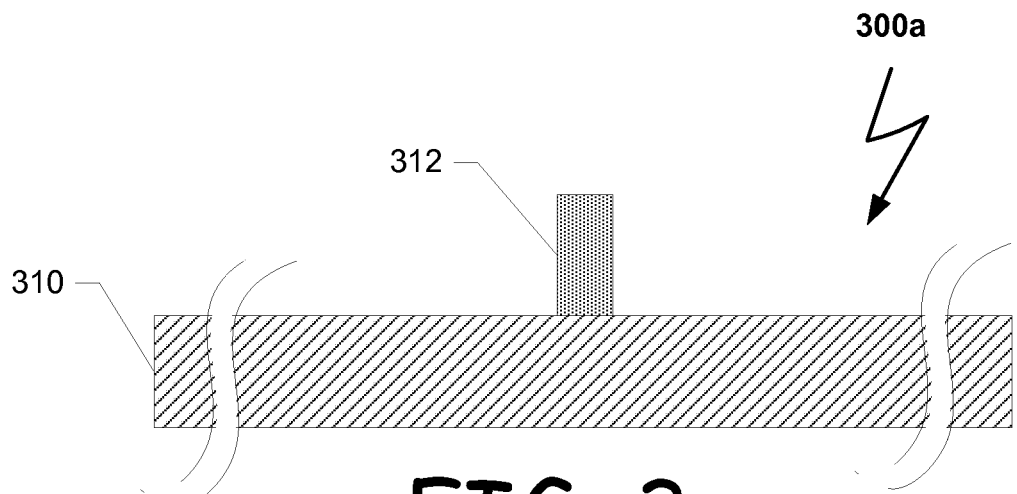
FIGS. 3a-f are schematic illustrations a plurality of simplified diagrams with relevant elements of exemplary surface-adhesive-rule (SAR) profiles, according to exemplary teaching of the present disclosure.
Figure 3B:
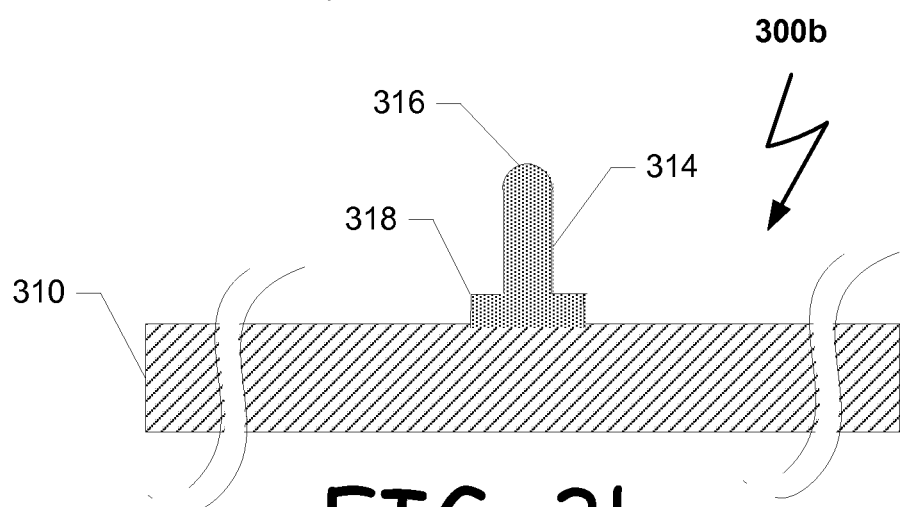

FIG. 3a schematically illustrates a simplified diagram with relevant elements of an exemplary surface-adhesive-rule die (SARD) 300a. The SARD 300a may comprise a body 310 and a surface-adhesive rule (SAR) 312. The SAR 312 may be adhered to the surface of the body 310. FIG. 3b schematically illustrates a simplified diagram with relevant elements of an exemplary surface-adhesive-rule die (SARD) 300b, in which the shape of a surface-adhesive rule (SAR) 314 may comprise a wide base 318, and a rounded-shape top edge 316.

The wide base 318 may improve the bonding of the SAR 314 to the body 310 of the SARD 300b. The wide base 318 may further enhance the ability of SAR 314 to withstand the numerous forces that may be applied during cutting/creasing/embossing operations. The shape of the top edge of the SAR 314 may match the functionality of the SAR 314. For example, the rounded-shape edge 316 may be used for creating crease lines on the surface of a cardboard.

Figure 3C:
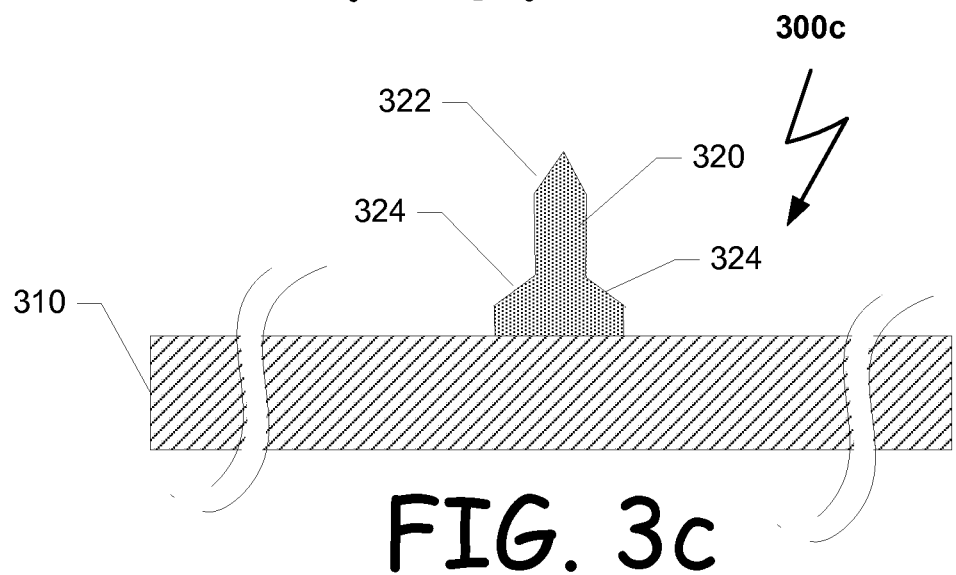

FIG. 3c illustrates another exemplary embodiment of a SARD 300c. The illustrated SARD 300c may comprise a SAR 320 with a sharp top edge 322. The shape of the top edge of the SAR 320 may match the functionality of the SAR 320. For example, the sharp edge 322 may be used for creating cutting lines on the surface of a cardboard. The SAR 320 may further comprise shoulder-like sides 324. The shoulder-like sides 324 enhance the ability of the SAR 320 to withstand the numerous forces during cutting/creasing/embossing operations. In some exemplary embodiments the sharp edge may be achieved by further milling (scraping) the edge after hardening the SAR.

Figure 3D:
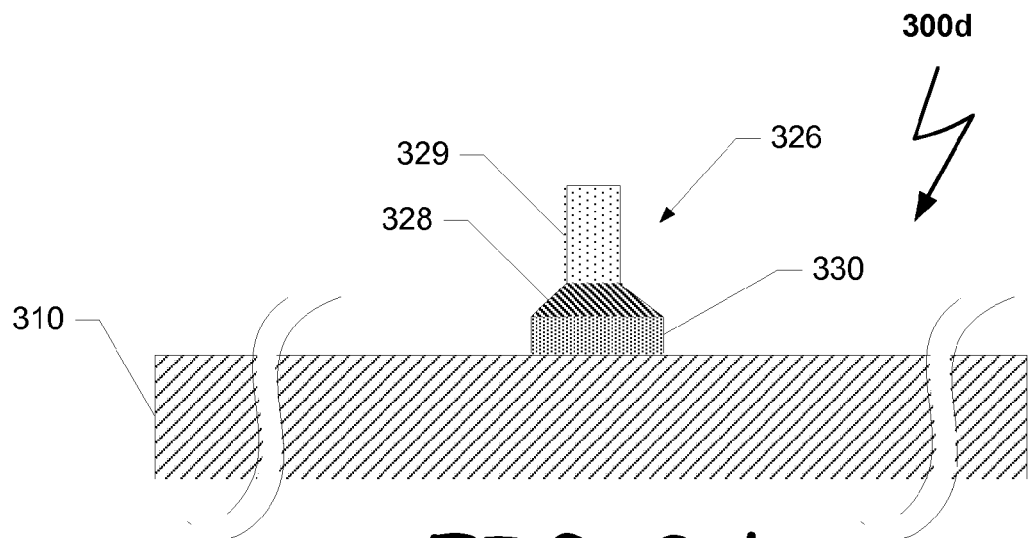

FIG. 3d schematically illustrates yet another simplified diagram with relevant elements of an exemplary SARD 300d. The SARD 300d may comprise a co-layer SAR 326. The co-layer SAR 326 may be comprised of 3 different types of layers, for example. One type of a layer for the base 330, another type of a layer for the shoulder-like sides 328, and a third type of a layer for the rest of the body of the SAR 329 and its top edge.

Each of the co-layers in the illustrated SAR 326 may be made of different materials or, one or more co-layers may be different from the other co-layers. Each co-layer may have a different: shape; cross-section; width; comprise different polymer types and/or additives; etc. Each co-layer may also have a different required attributes. For example, the lower base layer 330 may be required to have better adhesive attributes, the highest layer 329 may be required to have more elastic attributes, the shoulder-like sides may be required to have more firmness attributes 328, and so on. Other exemplary embodiments of co-layered SARs may have a different number of co-layers and different configurations of shapes and attributes.

Figure 3E:
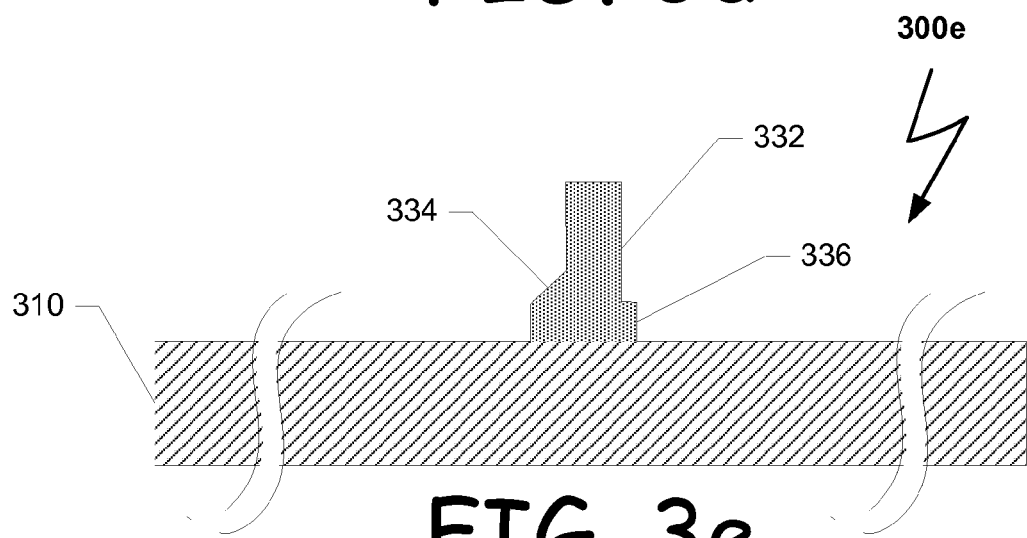
Figure 3F:
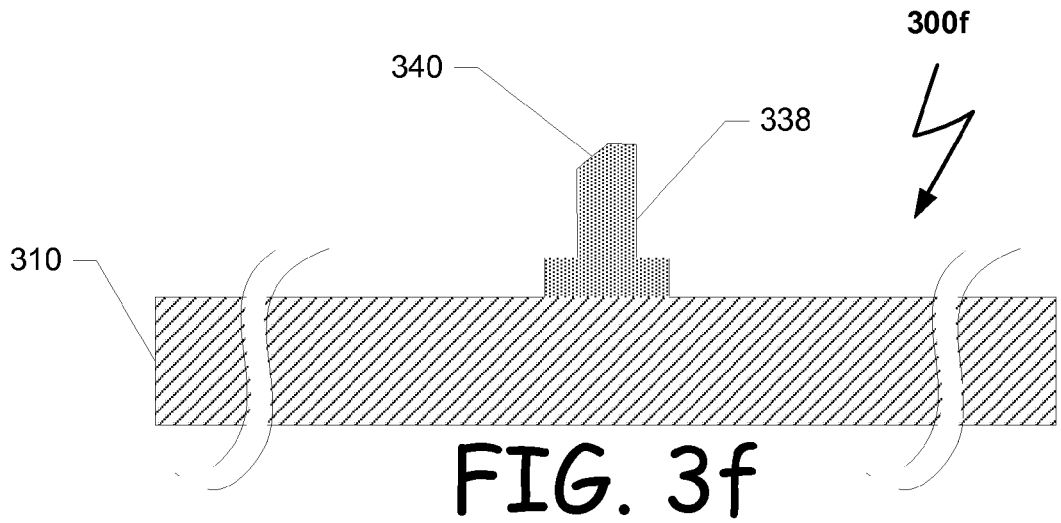

FIG. 3e illustrates yet another exemplary embodiment of a SARD 300e. The illustrated SARD 300e may comprise a SAR 332 with an asymmetrical shape. SAR 332 may be comprised of a one shoulder-like side 334 and an asymmetrical base 336, for example. An asymmetrical SAR may be used when drawing adjacent SARs. FIG. 3f illustrates an exemplary embodiment of a SARD 300f. The SARD 300f may be comprised of a SAR 338 with a trapezoid-like shape top edge 340. The trapezoid-like shape top edge 340 may be used as a cutting SAR in a rotary system, for example. It should be appreciated that in other exemplary embodiments, different combinations of two or more different profile SARs, and/or profile types other then the SARs depicted in FIG. 3a-3f may be used.

Figure 4:
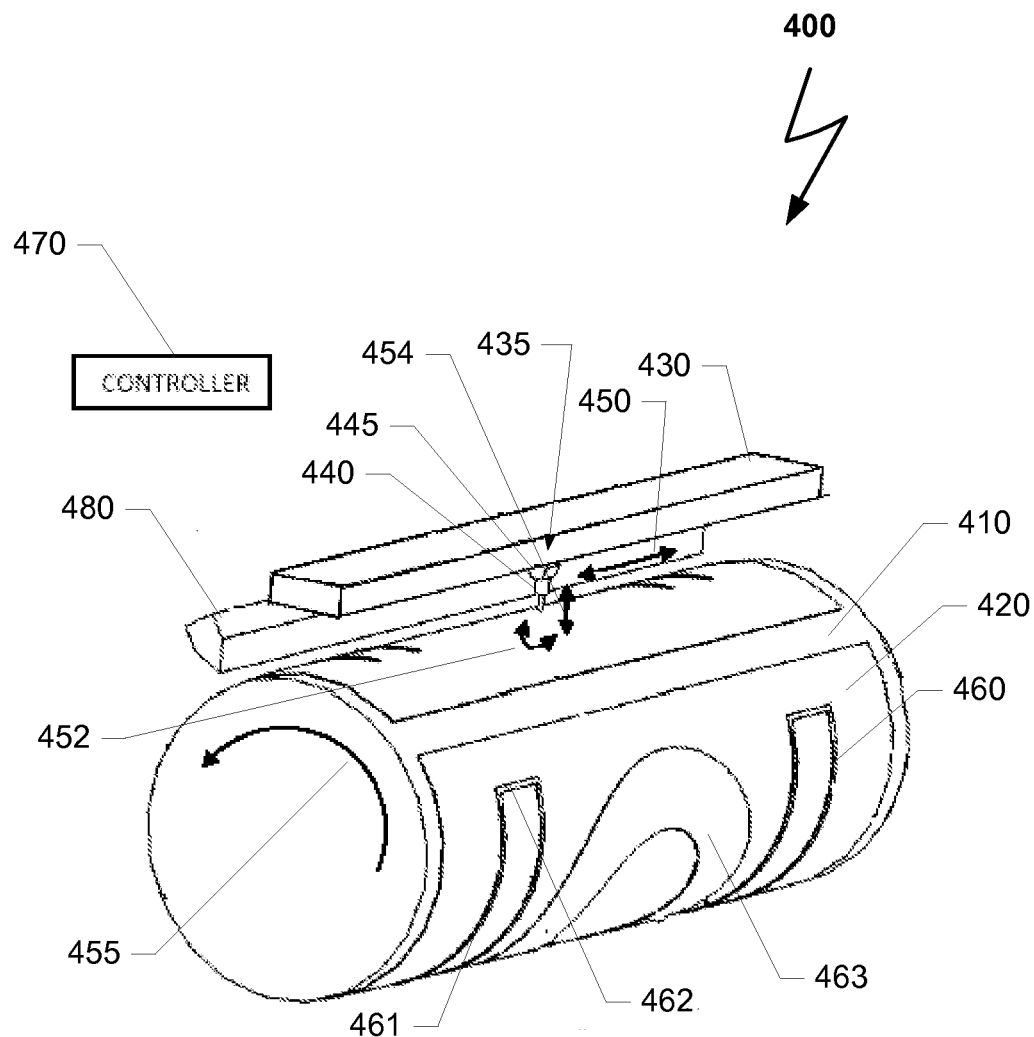
FIG. 4 depicts a schematic diagram with relevant elements of an exemplary surface-adhesive-rule technology (SART) system in accordance with some exemplary embodiments of the present disclosure.

FIG. 4 depicts a schematic diagram with relevant elements of a portion of an exemplary surface-adhesive-rule technology (SART) utilizing a rotary system 400. The surface-adhesive-rule technology's (SART) rotary system 400 may be used for drawing a plurality of surface-adhesive rules (SAR) 460-463 on the surface of a surface-adhesive-rule die's (SARD) body 420. The SARs 460-463 may protrude from the surface of the SARD's body 420 and may have different shapes and sizes. The SARs 460-463 may be functional and configured for cutting, creasing, embossing, etc. and/or a combination of two or more of these functions.

Surface-adhesive-rule technology's (SART) rotary system 400 may include a drum 410 on which the SARD's body 420 may be positioned. The body 420 of the SARD may be associated with or joined to the drum 410 using a variety of techniques including, but not limited to: adhesion, gripers, molding, coating, etc. In exemplary embodiments, the body 420 of the SARD may be removed from the drum 410 after the SARs 460-463 are created. In other exemplary embodiments, the body 420 of the SARD may be left on the drum 410, to be used for cutting/creasing/embossing cardboards operations in a rotary system, for example. In some exemplary embodiments, SART's rotary system 400 may include one or more drums.

A similar SART's rotary system 400 may be used for producing a SAR-counter die (SARCD). The SAR-counter die (SARCD) may be associated with the drum 410 in a similar ways as described elsewhere herein with regards to the body 420 of the SARD. In an exemplary embodiment, the SART's rotary system 400 may produce one flexible film layer to act as a SAR-counter die (SARCD). In alternate embodiments, the SART's rotary system 400 may produce a plurality of different flexible film layers to act as a SARCD. In yet another exemplary embodiment, the SART's rotary system 400 may produce only portions of the surface of the SAR-counter die's body, and so on. Other exemplary embodiments of producing a SAR-counter die (SARCD) are disclosed in conjunction with the description of FIGS. 16, 17 and 18 for example.

Exemplary SART's rotary system 400 may roughen the surface of the SARCD's body and/or the surface of the body 420 of the SARD using different tools. These tools may include, but are not limited to: a scraper, a laser, etc. Further, the SART's rotary system 400 may engrave a desired layout of trenches with a laser or mechanical tool, for example. In alternate exemplary embodiments, the SARCD body's surface may not cover the entire surface of the die's body. For example, it may be just two raised areas. The two raised areas may be drawn, molded, coated, etc.

In exemplary embodiments of the present disclosure, the SARCD's body and/or the SARD's body 420 may be made of flexible film. The flexible film may include one or more types of polymers. Exemplary polymers that may be used include, but are not limited to: polyester, polyamide, polycarbonate, and a combination of these or other polymers or polymer like substances. Furthermore, the flexible film may include one or more additives. These additives may include, but are not limited to: silica, ceramics, metal, different fillers, etc. Exemplary embodiments of the flexible film may comprise several layers. Each layer may comprise different materials.

The flexible film of the SARCD's body may have a strong enough sustainability, firmness, inside-cohesion, robustness, and lifespan to withstand the pressure and harsh operation which can be around a few tons of press force in one or more directions during the cutting/creasing/embossing operation of the cardboards. The SARCD's body may be associated with a substrate made of other material. These materials may include, but are not limited to metal, wood, plastic, etc.

The SAR 460-463 on the body 420 of the SARD may be flexible enough to bend even after hardening, but still rigid enough to serve their purposes of cutting, creasing and/or embossing.

SART's rotary system 400 may further include one or more rule-drawers. Exemplary embodiments of the rule-drawer may comprise: a drawing head 435, a controller 470, and one or more rails 430. The drawing head 435 may comprise: at least one nozzle 440, at least one cartridge 445 fluidly associated with the nozzle 440. The nozzle 440 may be associated with the rail 430. In exemplary embodiments, the nozzle 440 may slide upon the rail 430. In exemplary embodiments, the cartridge 445 is associated with the rail 430 as well. In other exemplary embodiments the cartridge 445 may be independent from the rail 430. Cartridge 445 may comprise flexible material that will be output by nozzle 440, thus drawing SARs 460-463, for example.

In exemplary embodiments, the cartridge 445 and the nozzle 440 may be associated with or controlled by a motor for moving the cartridge 445 and/or nozzle 440 back and forth on rail 430 in a direction indicated by arrow 450. In addition, the nozzle 440 may be adapted to rotate in the directions indicated by arrows 452. Optionally, nozzle 440 may also move up and down in the directions indicated by arrows 454. It should be noted, in some embodiments, the drawing-head 435 may be used as a single unit, while in other embodiments the nozzle 440 and/or the cartridge 445 may be moved independent from each other.

Drum 410 may be adapted to rotate in a counter-clockwise direction indicated by arrow 455. Optionally, drum 410 may rotate in a direction opposite to the direction indicated by arrow 455 (i.e., clockwise), and yet in some exemplary embodiments, the drum 410 may rotate in both directions. Further, the drum 410 may also be configured to move laterally in relationship to the rail. The controller 470 may operate to control and coordinate the movement and operations of the different modules or elements, as well as the operations of the SART's rotary system 400. For instance, the controller 470 may operate to control the rotation of the drum 410, the movement of the nozzle 440 and the cartridge 445; etc. The controller 470 may also instruct and control the nozzle 440 and cartridge 445 to deposit flexible material on SAR die's body 420 in order to draw a desired layout of SAR 460-463.

The nozzle 440 may output flexible material while moving in different directions. Exemplary directions may include, but are not limited to: directions indicated by arrows 450, 452 and/or 454 on rail 430 while drum 410 may move in the direction 455 and/or opposite to 455 as well as other directions. For example, in order to output, and thus draw SAR 461, drum 410 may move in a direction 455 (or opposite to this direction) while the nozzle 440 may remain in place. After a circumferential line SAR 461 may be completed, the nozzle 440 may be moved in direction 450 to draw SAR 462 while the drum 410 may remains stationary. Likewise, the SAR 462 can be drawn by moving the drum 410 in the direction of arrow 450 while the nozzle 440 remains stationary. Furthermore, SAR 462 can be drawn by moving the drum 410 in one direction along the path of arrow 450 and moving the nozzle 440 in an opposite direction.

In an exemplary embodiment, the SARs 460-463 may be drawn in one continuous deposit of flexible material by nozzle 440. Alternatively, the SARs 460-463 may be drawn by depositing a plurality of layers, each layer may comprise different flexible materials.

During the production of a single SARD 420 or SARCD, the drum 410 may rotate several times on its axis while the nozzle 440 may move a single time on rail 430. In other embodiments, the drum 410 may rotate a single time around its axis while nozzle 440 moves several times in different directions. Optionally, the nozzle 440 may be moved along rail 430 at the same time as drum 410 rotates to draw a diagonal and/or curved SAR. The speed and/or direction of rotation and/or movement of the nozzle 440 may depend on: the type and form of flexible material output, and the section of the SAR 460-463 being drawn, the layout, etc. The speed and/or direction of rotation and the movement of the nozzle 440 may be controlled by controller 470, for example.

The flexible material deposited by the nozzle 440 may include one or more different types of polymers or different combinations of two or more polymers or material having similar characteristics. Exemplary polymers that may be used are: polyester, polyamide, polycarbonate, polyurethane, acrylic, polypropylene, polyethylene, etc. Furthermore, the flexible-material may include one or more additives. The additives may include, but are not limited to: silica, ceramics, metal, various fibers, different fillers, etc.

In exemplary embodiments, the flexible material of the SARs may comprise several layers (co-layers). Each layer may be made of different materials and/or each layer may have a different: shape; cross-section; width; comprise different polymer types and/or additives; etc. Each layer may also have a different required set of attributes. More information on layers of the SAR is presented herein in conjunction with the description of FIG. 3d and FIGS. 9a-b.

The flexible material output by the nozzle 440 may be hardened after and/or while the drawing is being performed. The hardening may be accomplished by a hardener 480. The hardener 480 may irradiate energy that can cause the drawn flexible material to harden and/or adhere. Irradiated energy may include, but is not limited to: ultra violet (UV) light, visible light, heat, etc. Alternatively, cooler air may be directed at the drawn flexible material to cool and thus harden the material.

The type of energy irradiated by the hardener 480 generally depends on the type of flexible material and the hardening characteristics of that material. For example, when the flexible material is a thermosetting material, heat may be applied by the hardener 480. When the flexible material is a thermoplastic material, the hardener 480 may cool the material in order to harden it. Yet when the flexible material is comprised of photo-initiator ingredients, the hardener 480 may illuminate UV lighting in order to harden the flexible material. Optionally, when one or more flexible materials utilized, one or more types of hardeners 480 may be used.

The hardener 480 may be positioned adjacent to the nozzle 440 such that the flexible material may be hardened immediately after it is drawn. In other exemplary embodiments the hardener 480 may be positioned at a distance from the nozzle 440. In some embodiments, the hardener 480 may not be provided in SART's rotary system 400 and SAR 460-463 may be hardened by another system. In yet other exemplary embodiments, no hardener 480 may be used.

In some exemplary embodiments, the hardener 480 may be used for pre-treatment. The pre-treatments may include, but are not limited to: ozone showers, primer coatings, surface roughening, etc. In embodiments in which the hardener 480 is used for pre-treatment, the hardener 480 may comprise different modules (not shown in drawings). Exemplary modules include but are not limited to: laser beams, UV flash light, cartridge(s) with primer substances, cartridge(s) with adhesive substances, and so on. The hardener 480 and its modules may be controlled by the controller 470, for example.

Figure 5:
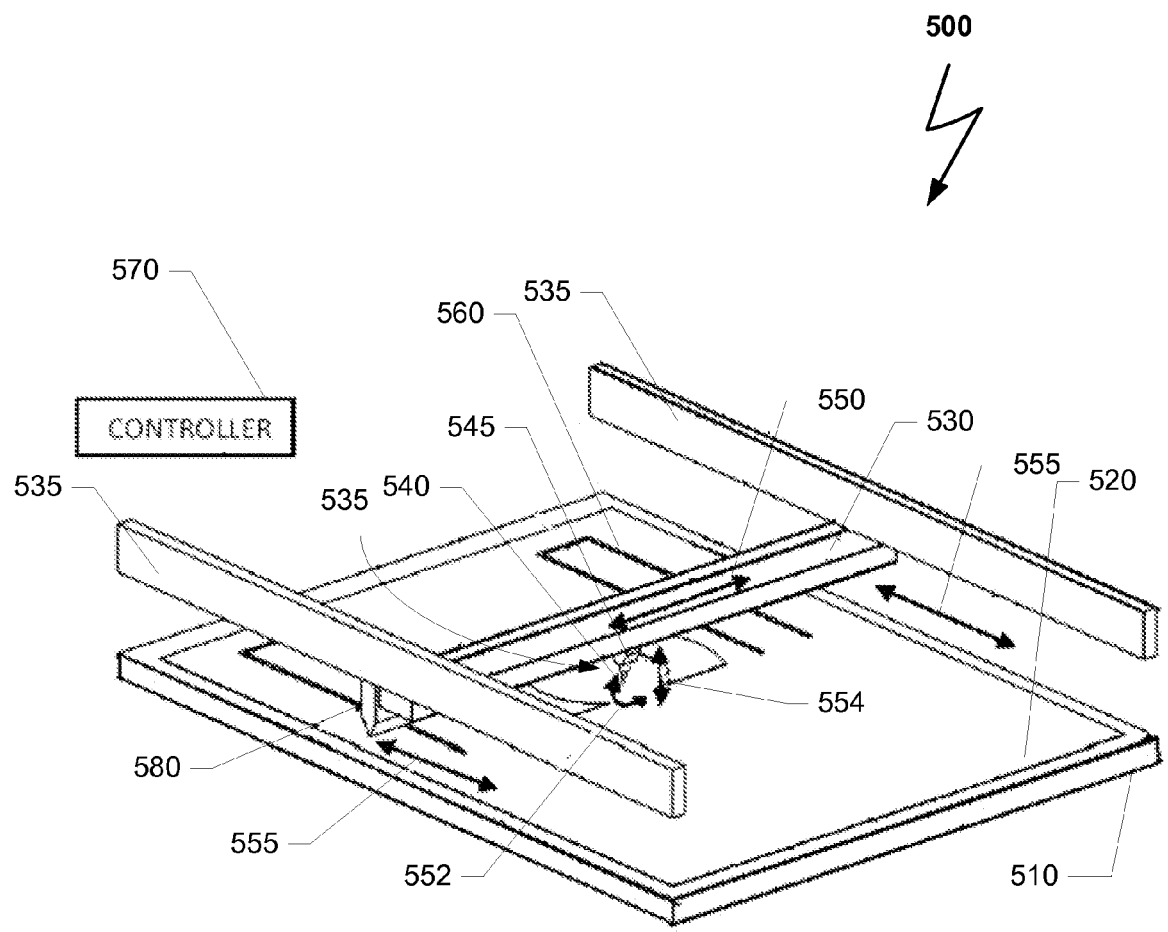
FIG. 5 depicts a schematic diagram with relevant elements of another exemplary surface-adhesive-rule technology (SART) system for producing a die in accordance with some exemplary embodiments of the present disclosure.

FIG. 5 illustrates an exemplary portion with relevant elements of a surface-adhesive-rule technology's (SART) flat system 500. The SART's flat system 500 may be used for drawing an exemplary SAR 560 on the surface of a SARD's body 520 that may be positioned on a flat substrate 510. The SART's flat system 500 may include one or more rule-drawers. Exemplary embodiments of the rule-drawer may comprise: a drawing-head 535, a controller 570, and one or more rails 530. The drawing-head 535 may comprise: at least one nozzle 540 and at least one cartridge 545 associated with or fluidly coupled to the nozzle 540.

The SAR 560 may be drawn by the at least one nozzle 540 associated with the at least one cartridge 545. The nozzle 540 may further be associated with a motor to cause the nozzle 540 to traverse along the rail 530 in the directions of arrow 550, for example. Optionally, the nozzle 540 may also be adapted to rotate in directions illustrated by arrows 552 and/or 554. The rail 530 may be situated between two rails 535, substantially perpendicular to rail 530 and is adapted to travel in the directions of arrow 555, for example.

Control 570 may be adapted to control the movement and coordinate the different modules of the SART's flat system 500. For example the controller 570 may control one or more of the nozzle 540, the rail 530, the cartridge 545, etc. In some exemplary embodiments, the SART's flat system 500 may further include a hardener 580 for hardening and/or adhering the SAR 560 to the surface of the SARD's 520 body, similar to hardener 480 shown and described in conjunction with the description of FIG. 4. In some embodiments, flat substrate 510 may be adapted to move in the directions depicted by arrow 555. It will be appreciated that various other configurations may be used in various embodiments and as long as the configurations allow the nozzle 540 and the body 520 of the SARD to be moved relative to each other sufficiently to cover the required area of the body 520 of the SARD, and to deterministically draw the SARs, then the configuration is anticipated. In some embodiments, the SARD's body 520 may be bent around a cylindrical drum, after the deposition of the SARs. The SART's flat system 500 and SART's rotary system 400 may be similar in their functionality.

Figure 6:
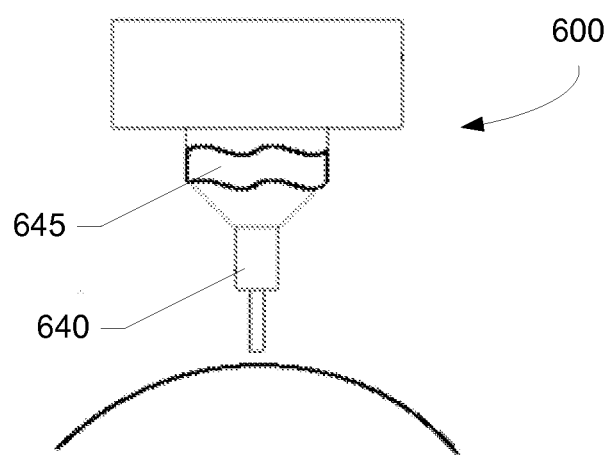
FIG. 6 depicts a schematic diagrams with relevant elements of an exemplary nozzle and cartridge of a rule-drawer, according to exemplary teaching of the present disclosure.

FIG. 6 depicts relevant elements of an exemplary embodiment of a drawing-head 600. The drawing-head 600 may be comprised of a nozzle 640 for depositing flexible material. The nozzle 640 may be associated with or fluidly coupled to a cartridge 645. The cartridge 645 may contain flexible material and associated with a pressure actuator (not shown in the drawing) for depositing the flexible material by injecting it or forcing it through the nozzle 640 to draw a desired SAR. In some embodiments, the nozzle 640 and its orifice may have various shapes. More information on the different shapes and orifices is disclosed in conjunction with the description of FIGS. 7a-b.

Figure 7A:
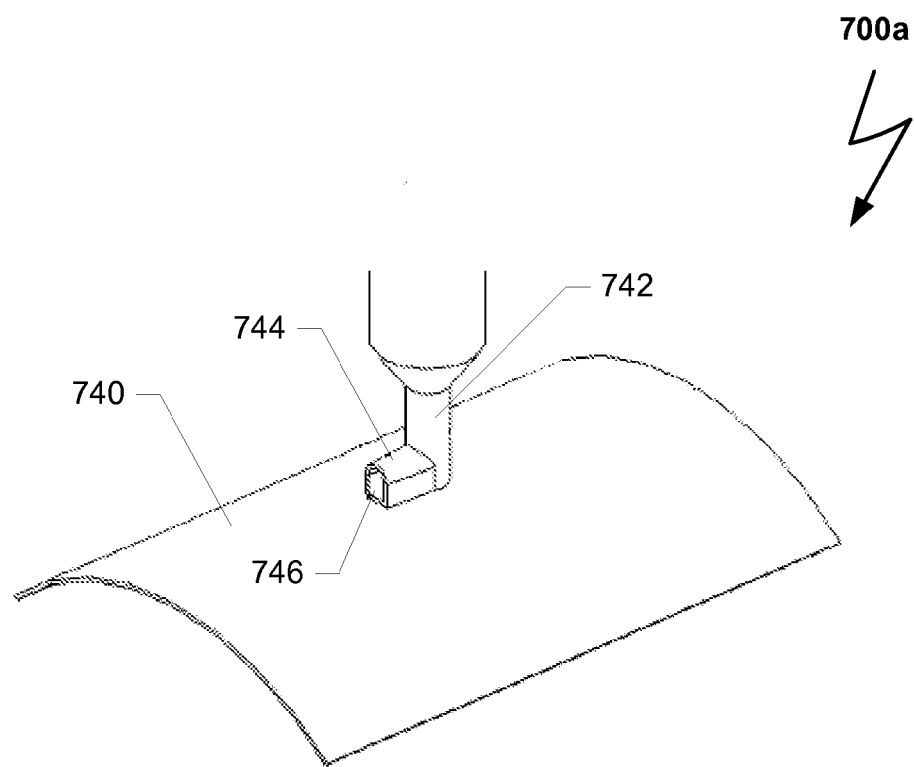
FIGS. 7a-b are schematic illustrations of simplified diagrams with relevant elements of an exemplary nozzles and cartridges of a rule-drawer, according to exemplary teaching of the present disclosure.

FIG. 7a is a schematic illustration of relevant elements of an exemplary nozzle 700a. The exemplary embodiment of the nozzle 700a may include a first tube 742 that may be substantially perpendicular to the body 740 of the SARD. A second tube 744 may be oriented substantially perpendicular to the first tube 742 and parallel to the body 740 of the SARD. The tube 744 may have an orifice 746 at its end through which flexible material may be output toward the body 740 of the SARD. The orifice 746 may have different cross-sectional shapes. The cross-sectional shapes of the orifice may be determined according to the required SAR profile, for example. Exemplary cross-sectional shapes of the orifice 746 may match the profile of the SARs depicted in FIG. 3a-f, for example.

Figure 7B:
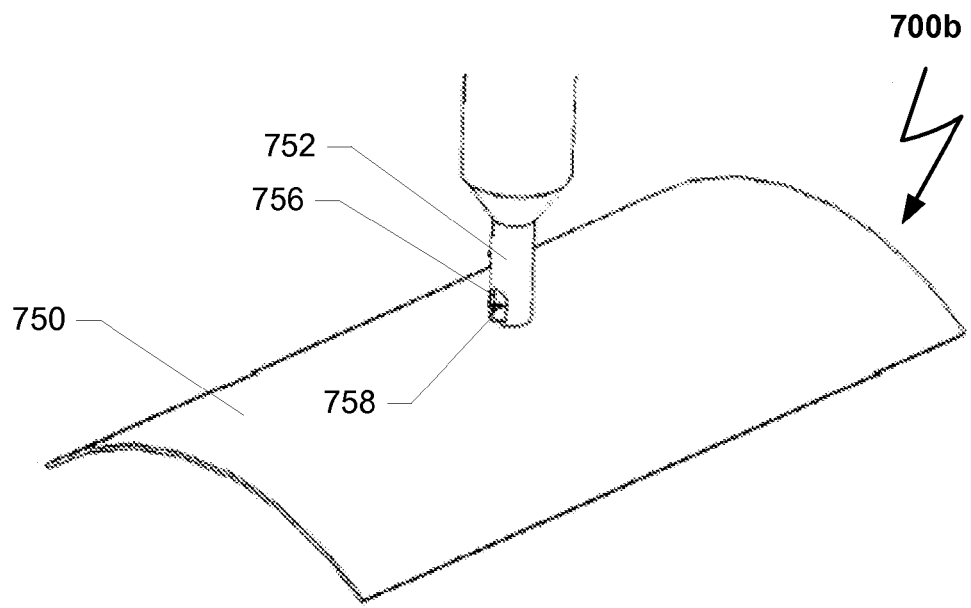

FIG. 7b is a schematic illustration of relevant elements of another exemplary nozzle 700b. The exemplary embodiment of the nozzle 700b may include a tube 752 that is oriented substantially perpendicular to a SARD's body 750. The tube 752 may include an orifice 756 through which flexible material may be output toward the body 750 of the SARD. The orifice 756 may have various shapes as described in conjunction with orifice 746 of FIG. 7a. Optionally, the tube 752 may be closed at its distal end 758, and the material may be released substantially parallel to SARD's body 750, through opening 756. Alternatively, distal end 758 may be open and the flexible material may be output in a substantially perpendicular manner through distal end 758 as well as through 756, and so on. Wherein substantially perpendicular may be in the range of 90 degree plus/minus 30 degrees, for example.

Other nozzles may be used in accordance with embodiments of the present disclosure. For example, nozzles manufactured by Nordson Corporation which can be viewed at the following URL www<dot>nordson<dot>com may be utilized. The types of nozzles used may differ according to: the material that is being output onto the SARD, the required shape of SAR, etc. In some exemplary embodiments, the orifice of the nozzle may be directed in a direction opposite to the relative direction of motion of the nozzle with respect to the surface of the SARD's body 750. In exemplary embodiments the orifice of the nozzle may be parallel to the surface of the SARD's body 750. In alternate embodiments the nozzle may be at a pre-defined angle to the surface of the SARD's 750. Exemplary angles may be at the range of 45-135 degree.

Figure 8A:
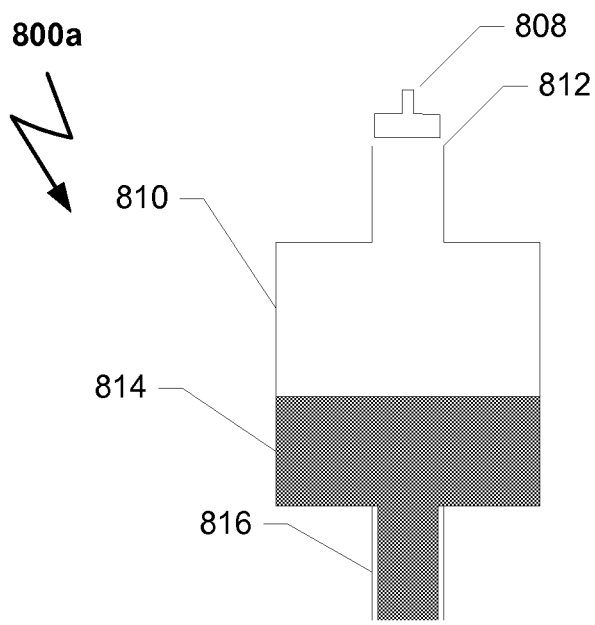
FIGS. 8a-f are schematic illustrations of a plurality of simplified diagrams with relevant elements of exemplary pressure actuators of a rule-drawer, according to exemplary teaching of the present disclosure.

FIG. 8a schematically illustrates a simplified diagram with relevant elements of an exemplary pressure actuator 800a. The pressure actuator 800a may be an air-pump actuator, for example. A cartridge 810 may contain a flexible material 814, for example. The flexible material 814 may be used to draw SARs for example. The cartridge 810 may have an output 816 through which the flexible material 814 may be output or used to fluidly couple the cartridge 810 to a nozzle. The cartridge may have an input 812 through which air may be compressed and thus press the material out of the cartridge's output 816 via a nozzle (not shown in drawing) according to a SAR layout. The air may be compressed by a piston 808, for example. The piston 808 may be controlled by a controller similar to the controller 470 of SART rotary system 400 and/or controller 570 of SART flat system 500. Pressure actuators 800a may have suction capabilities as well.

Figure 8B:
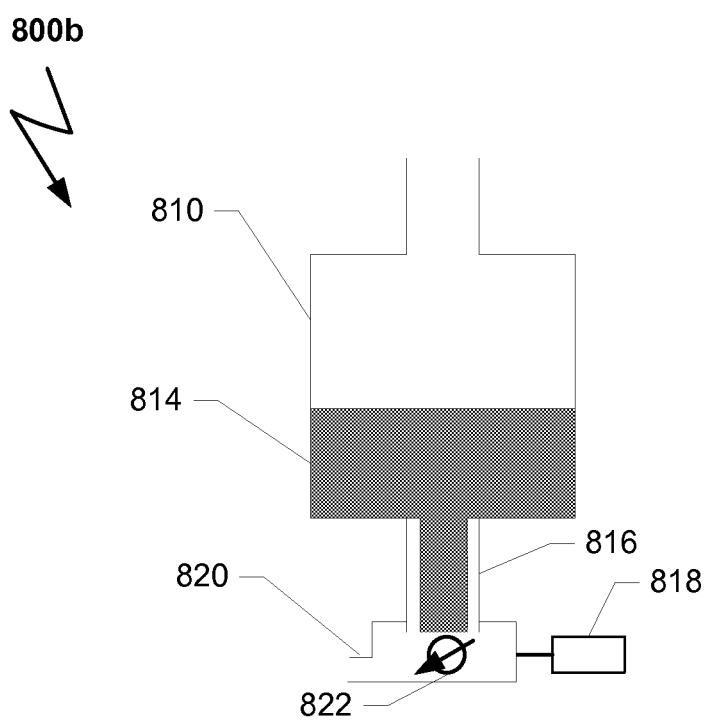

FIG. 8b schematically illustrates a simplified diagram with relevant elements of exemplary pressure actuators 800b. The pressure actuator 800b may an electrical cogwheel pump, for example. The cartridge 810 and flexible material 814, may be similar to that as described for the cartridge 810 and flexible material 814 in FIG. 8a. The flexible material 814 may be carried by a cogwheel 822 out of the cartridge output 816. The cogwheel 822 may be actuated by an electric/step motor 818, for example. The operation of the cogwheel 822 and the motor 818 may be controlled by a controller similar to controller 470 of SART rotary system 400 and/or controller 570 of SART flat system 500. The flexible material may be output from the cogwheel's 822 output 820 to a nozzle (not shown in the drawing) according to a SAR layout. Pressure actuator 800b may have suction capabilities as well.

Figure 8C:
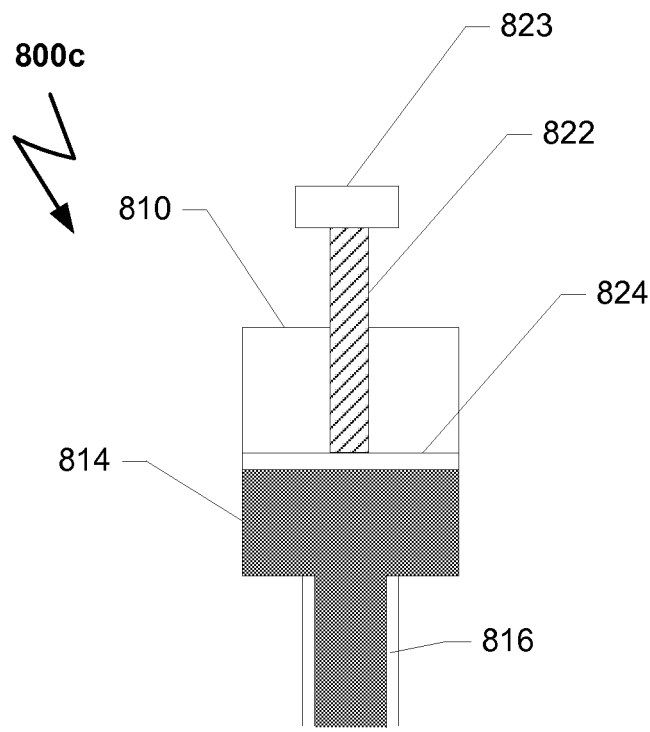

FIG. 8c schematically illustrates a simplified diagram with relevant elements of an exemplary pressure actuator 800c. The pressure actuator 800c may be a screw-piston pump, for example. The screw-piston pump may be comprised of a screw 822 associated with a plate 824, and an engine or motor 823, for example. Cartridge 810 and flexible material 814, may be similar to the cartridge 810 and flexible material 814 described in FIG. 8a. The flexible material 814 may be pressed out of the cartridge output 816 by the screw-piston pump as the screw 822 is screwed by the engine 823, thus causing the plate 824 to press the flexible material 814 out of the cartridge 810 output towards a nozzle (not shown in drawing) according to a SAR layout. The operation of the screw-piston pump 800c may be controlled by a controller similar to controller 470 of SART rotary system 400 and/or controller 570 of SART flat system 500. The screw-piston pump 800c may have suction capabilities as well.

Figure 8D:
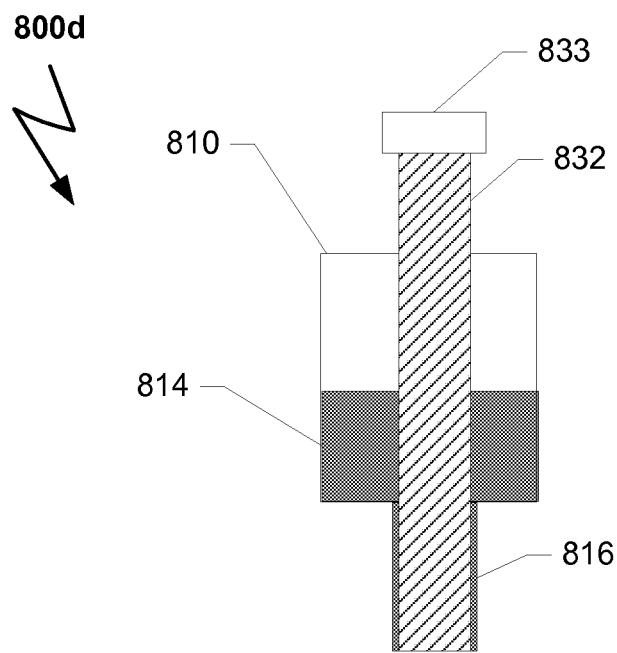

FIG. 8d schematically illustrates a simplified diagram with relevant elements of an exemplary pressure actuator 800d. The pressure actuator 800d may be a screw pump 832, for example. The cartridge 810 and flexible material 814, may be similar to the cartridge 810 and flexible material 814 described for FIG. 8a. The flexible material 814 may be carried out between the spindles of the screw 832 toward the cartridge output 816 and towards a nozzle (not shown in drawing) according to a SAR layout by the screw pump 832 as the screw pump 832 is screwed by an engine 833. The operation of the screw pump 832 may be controlled by a controller similar to controller 470 of SART rotary system 400 and/or controller 570 of SART flat system 500. The screw pump 832 may have suction capabilities as well.

Figure 8E:
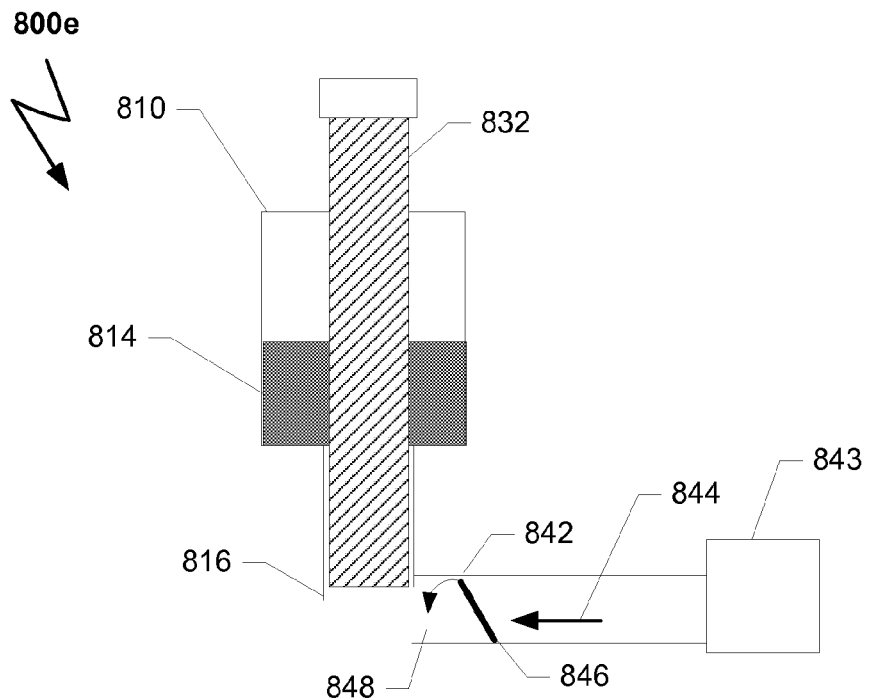

FIG. 8e schematically illustrates a simplified diagram with relevant elements of an exemplary pressure actuator 800e. The pressure actuator 800e may be a screw pump 832, for example. The pressure actuator 800e may be similar to the pressure actuator 800d described in conjunction with FIG. 8d.

The pressure actuator 800e may further comprise a cut-off mechanism. The cut-off mechanism may comprise a tube 842 in which pulses of air, liquid, etc. may pass through in the direction of arrow 844, for example. The air, liquid, etc. pulses may be created by a pulse-pump 843 associated with the tube 842, for example.

The cut-off mechanism may further comprise a switch/valve that may be controlled by a controller similar to controller 470 of SART rotary system 400 and/or controller 570 of SART flat system 500. The pulse-pump 843 may be controlled by the controller, as well. The switch/valve may comprise a shutter arm 846 or may be a ball valve or other structure. The switch/valve may have two modes. One mode may be an open-mode in which the shutter arm 846 is substantially parallel to tube 842. The second mode may be a closed-mode in which the shutter arm 846 is substantially perpendicular to tube 842 or oriented in a manner to prevent flow.

In an exemplary embodiment, when the cut-off mechanism is activated, at the end of a SAR drawing for example, the following actions may take place: output of the flexible material by screw-pump 832 is stopped; the screw-pump 832 may be screwed in the counter-clockwise direction (or retracted); the shutter arm 846 is switched to open-mode in the direction similar to arrow 848; a pulse of air, liquid, etc. may be created and output from the pulse-pump 843 in direction of arrow 844. In other exemplary embodiments one or more shutter arms or valves may be used.

Figure 8F:
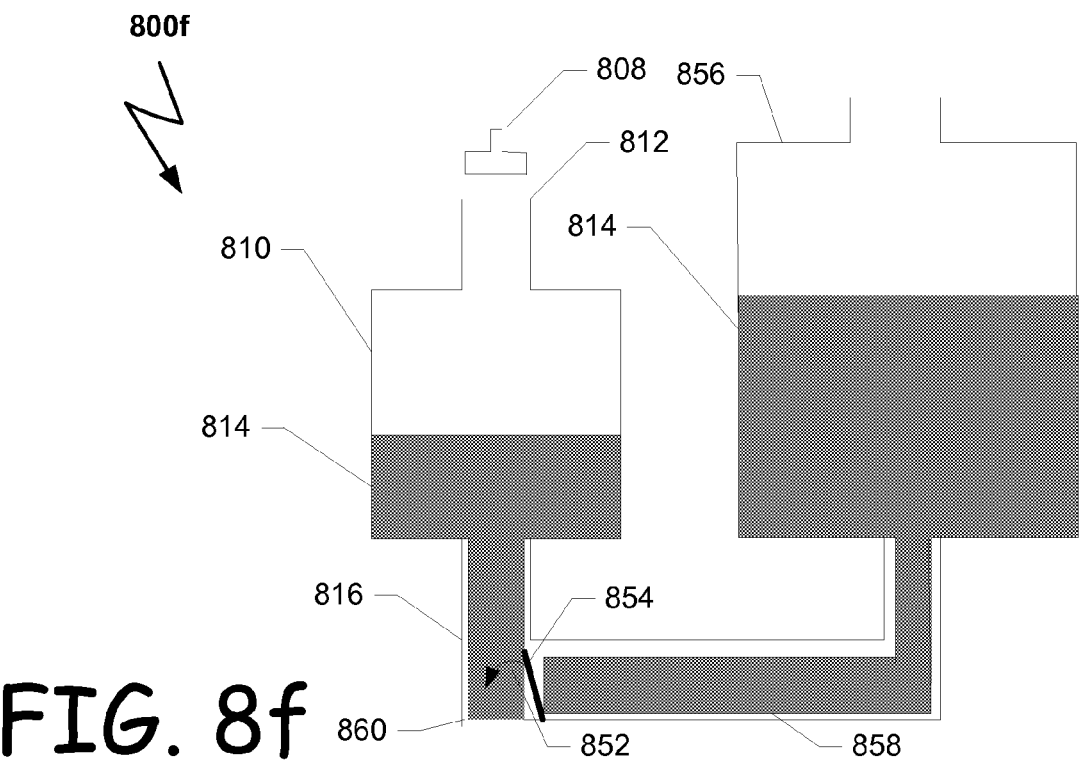

FIG. 8f schematically illustrates a simplified diagram with relevant elements of an exemplary pressure actuator 800f. The pressure actuator 800f may be similar to pressure actuators 800a-e described in conjunction with FIGS. 800a-e. The pressure actuators 800f may further comprise a filling mechanism. The filling mechanism may comprise a reservoir 856 that may contain flexible-material 814; a tube 858 in which the flexible material may pass through; and a switch/valve that may be controlled by a controller similar to controller 470 of SART rotary system 400 and/or controller 570 of SART flat system 500.

The switch/valve may comprise a shutter arm 854. The switch may have two modes. One mode may be open-mode in which the shutter arm 854 is substantially parallel to tube 858 and may shut aperture 860. The second mode may be closed-mode in which the shutter arm 854 is substantially perpendicular to tube 858 or oriented such that the flow from tube 858 is restricted.

In an exemplary embodiment, when the filling mechanism is activated, and the cartridge 810 is required to be filled with flexible material 814 for example, the following actions may take place: output of the flexible material from output 816 is stopped; piston 808 may be pulled outward from cartridge 810; the shutter arm 854 may be switched to open-mode in the direction similar to arrow 852; flexible material may be output from the cartridge 856 toward the shutter arm 846. In other exemplary embodiments one or more shutter arms may be used. In other embodiments the cartridge 810 may be filled through opening 812, for example. The cartridge 856 may be easily and quickly disconnected from tube 858, and replaced with another one, for example. The Cartridge 856 and it's flexible material may be purchased by the owner of the SART system.

Figure 9A:
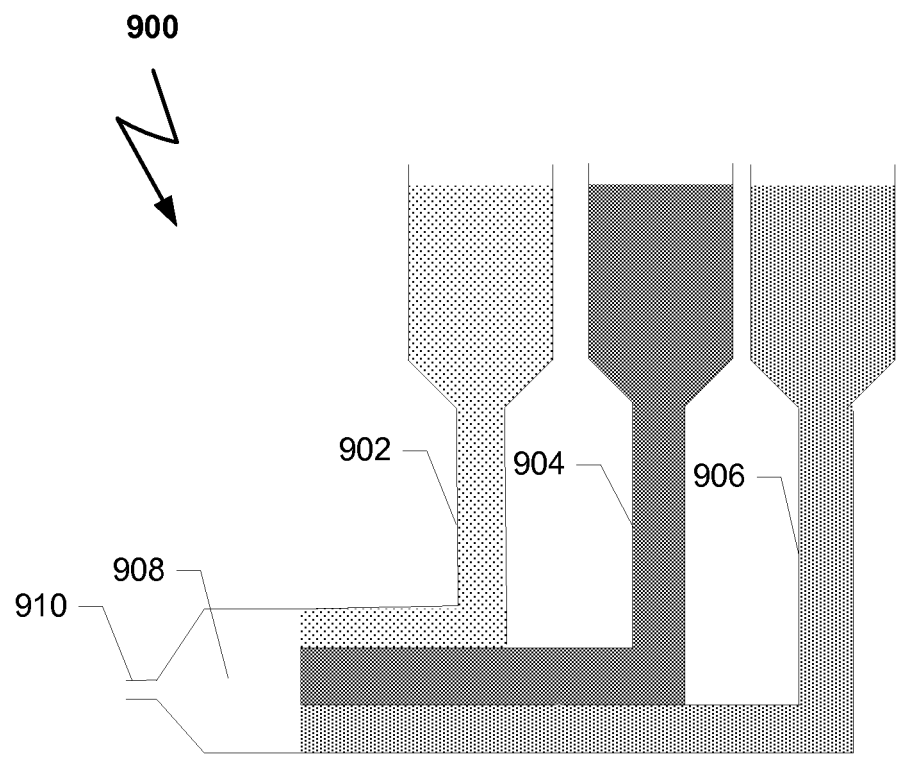
FIGS. 9a-b are schematic illustrations of different co-layer creations, according to exemplary teaching of the present disclosure.

FIG. 9a depicts a simplified diagram with relevant elements of an exemplary embodiment of a multiple-compartment cartridge 900. The multiple-compartment cartridge 900 may be used to draw a co-layer SAR, for example. The multiple-compartments cartridge 900 may comprise a plurality of compartments 902, 904, and 906 for example. Each compartment may comprise a cartridge and a pressure actuator (not shown in the drawings), for example. Each compartment 902, 904, and 906 may contain, separately, one or more ingredients of flexible material. In alternate embodiments each compartment may comprise a different flexible material, for a different layer of the co-layer, and so on.

The cartridge 900 may further comprise a combiner 908. In exemplary embodiments, the combiner 908 may combine the different ingredients and/or flexible material, for example. The combiner 908 may comprise a slot/aperture 910 through which the combined material from the different compartment 902, 904, and 906 may be output. A controller, 470 (FIG. 4) and/or controller 570 (FIG. 5), may control the quantities of each ingredient/material/layer. In some exemplary embodiment one or more of the different compartments 902, 904, and 906 may comprise adhesive substance. In addition, the combiner 908 may include an agitator (not shown) to facilitate the mixing and combining of the materials from two or more of the different compartments 902, 904, and 906.

The different layers may be bonded to one another during different hardening techniques, for example. Exemplary hardening techniques include, but are not limited to: temperature treatment, Ultra-Violet (UV) curing, visible light, infra red light, chemical curing, cooling etc. In other embodiments, the different layers may be bonded by an adhesive. In such embodiments, an adhesive substrate layer compartment may be placed between the compartments comprising the layers that will need to be adhered. In yet other embodiments the bonding may be a combination of the above techniques.

Figure 9B:
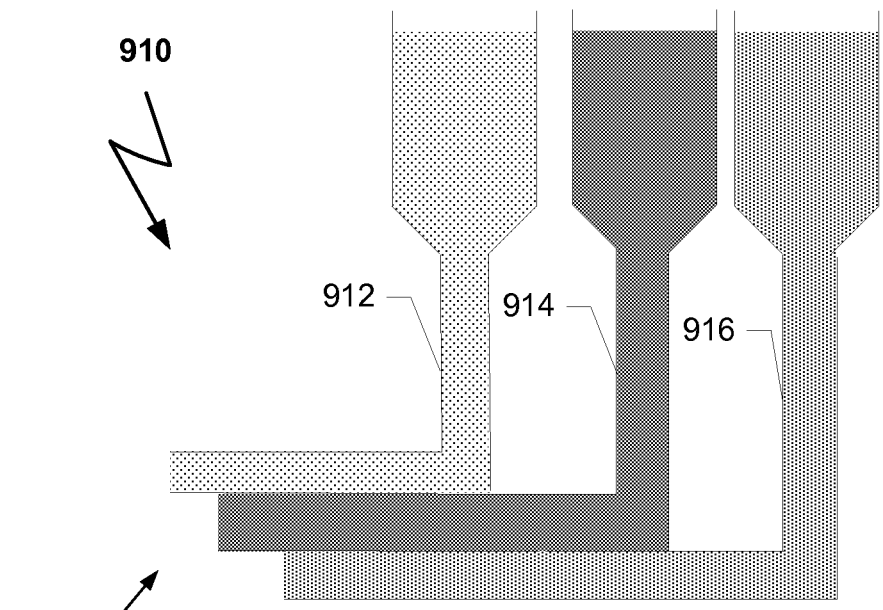

FIG. 9b schematically illustrates a co-layer creation by an exemplary embodiment of a multiple-compartment cartridge 910. The multiple-compartment cartridge 910 may comprise a plurality of compartments 912, 914, and 916 for example. The compartment 916 may be the leading edge of the drawing head 910. Each compartment may comprise a cartridge and a pressure actuator (not shown in the drawing). In an exemplary embodiment, each compartment may comprise a different flexible material, for a different layer of the co-layer, and so on. A controller, 470 (FIG. 4) and/or controller 570 (FIG. 5), may control the co-layer drawing, for example. In some exemplary embodiments, one or more of the different compartments 912, 914, and 916 may comprise adhesive substance. The multiple-compartments cartridge 910 may have a stair-like shape edge.

In some embodiments, the co-layer may be created in phases. An exemplary phase technique includes, but is not limited to: drawing a first layer on the surface, next drawing on top of it the next layer and so on. This exemplary embodiment may comprise a plurality of cartridges. Each cartridge may comprise a different material for a different layer and/or adhesive substance. The controller may control the operation. In some embodiments, a combination of the different co-layer techniques and multiple-compartments cartridge may be used.

FIG. 10a-d schematically illustrates a flowchart showing relevant processes or actions of an exemplary rule drawing method 1000. The illustrated rule drawing method 1000 may be executed by a controller, a microprocessor, a microcontroller, a computer or any other processing device including (collectively referred to as a controller), but not limited to controllers similar to controller 470 (FIG. 4) and/or controller 570 (FIG. 5). The method 1000 may be initiated 1002 upon powering on the controller but, it will be appreciated that the method 1000 may be initiated or invoked from other processes, system, events, user actions, etc. During initiation 1002, the controller may operate to detect the various modules in the system or, the various modules or other processors may provide information to the controller to identify the different modules. Exemplary modules may include, but are not limited to: drawing head modules, different registers, different timers, etc. After being invoked the process may then act to reset, initialize or determine the state of various resources, registers, variables, memory components, etc. 1004. The various resources may include, but are not limited to: timers (t), counters (R), distance measurers (D), and so on.

After the system resources have been initialized 1004, the rule drawing method 1000 may enter into a delay loop waiting for the reception of an initiation command 1006. The initiation command directs the rule drawing method 1000 to commence the creation of a SARD. When an initiation request is received 1006, the method 1000 may proceed to act 1008 by receiving or obtaining the entry of various inputs or parameters used in the creation of SARD. The inputs may be received, obtained or entered by a user, provided by a processor or other entity, read from an electronic file, etc. Exemplary inputs may include, but are not limited to: the depth or thickness of the cardboard that will be pre-treated while using the SARD, the type of surface-adhesive rules (SAR) that will be required, the requested layout, and so on. The method 1000 may check 1010 a look-up table for information on the required job description. Exemplary information may include, but is not limited to: the definition of flow index for each SAR, the definition of profile for each SAR, the definition of the layers for the co-layers, the type of SAR (cutting/embossing/creasing), etc.

Once the information has been received, the method then decides whether additional information in the look-up table has been found or is available 1012. If additional information is not found 1012, then method 1000 may prompt the user or other information provider to enter or provide the information 1014, and processing then returns to act 1008 to check for this information. If the method obtains the information in the look-up table or otherwise 1012, then the method 1000 may proceed to act 1018. The method 1000 may then proceed to execute a SAR drawing loop that comprises the acts listed in blocks 1018 through 1046 (FIG. 10d). The first action in the SAR drawing loop comprises increasing counter R by one (incrementing R) 1018, and the method 1000 may begin drawing a SAR in accordance with the information received at action 1010 and layout requirements, for example.

Once the counter is increased, the method continues by adjusting or setting the height and angle of a nozzle t 1020. In addition, the velocity of the drawing head modules may be accelerated 1020 to a required velocity V1 by acceleration rate a1, for example. The pressure applied by a one or more pressure actuators may also be raised 1020 to a required pressure P1, and so on. Yet, in alternate embodiments, in which screw-pumps are used for example, instead of raising pressure P1, a screwing speed is raised. Next the method 1000 may proceed to act 1022 at FIG. 10b.

After adjusting or setting the nozzle, velocity and pressure, the method continues by entering a delay loop 1022 until the value of timer t is equal to t1. The value of t1 may be calculated according to the mechanical capabilities of the drawing-head and the length required for the SAR or SAR segment according to the layout. When timer t value is equal to the value of t1, the acceleration rate a1 of the velocity of the drawing head modules may be stopped 1024 and the raising of the pressure of the pressure actuator may be stopped 1024 as well. Thus the drawing head modules may continue drawing at velocity V1 and the pressure actuator may continue pressing at pressure P1. In alternate embodiment instead using a timer, a distant measurement D may be used. The distant measurement D may be expressed by a number of steps given to a step-motor or by feedback received from a step measurement encoder associated to the drawing head.

While the drawing continues, the method 1000 may enter into a delay loop until the value of counter t is equal to t2 1026. Wherein t2 may be calculated from inputs on the drawn pattern of the SAR and the velocity that was reached at t1. When the timer t value is equal to t2 1026, the velocity of the drawing head modules may be decelerated 1028 to V2 at deceleration rate a2, and the pressure by the pressure actuator may be decreased 1028 to P2. In exemplary embodiments, the nozzle may be 1030 elevated X mm and turned 1030 to an angle O according to the requirements of the layout. Next the nozzle may be lowered 1030 Z mm (wherein Z may equal X).

The method 1000 continues by accelerating the drawing head modules to a velocity of V1 at an acceleration rate of a1, and the pressure of the pressure actuator may be raised to P1 1032. The drawing head modules may continue to draw 1032 the SARs according to the layout. The method 1000 may then proceed to act 1034 at FIG. 10c.

Figure 10A:
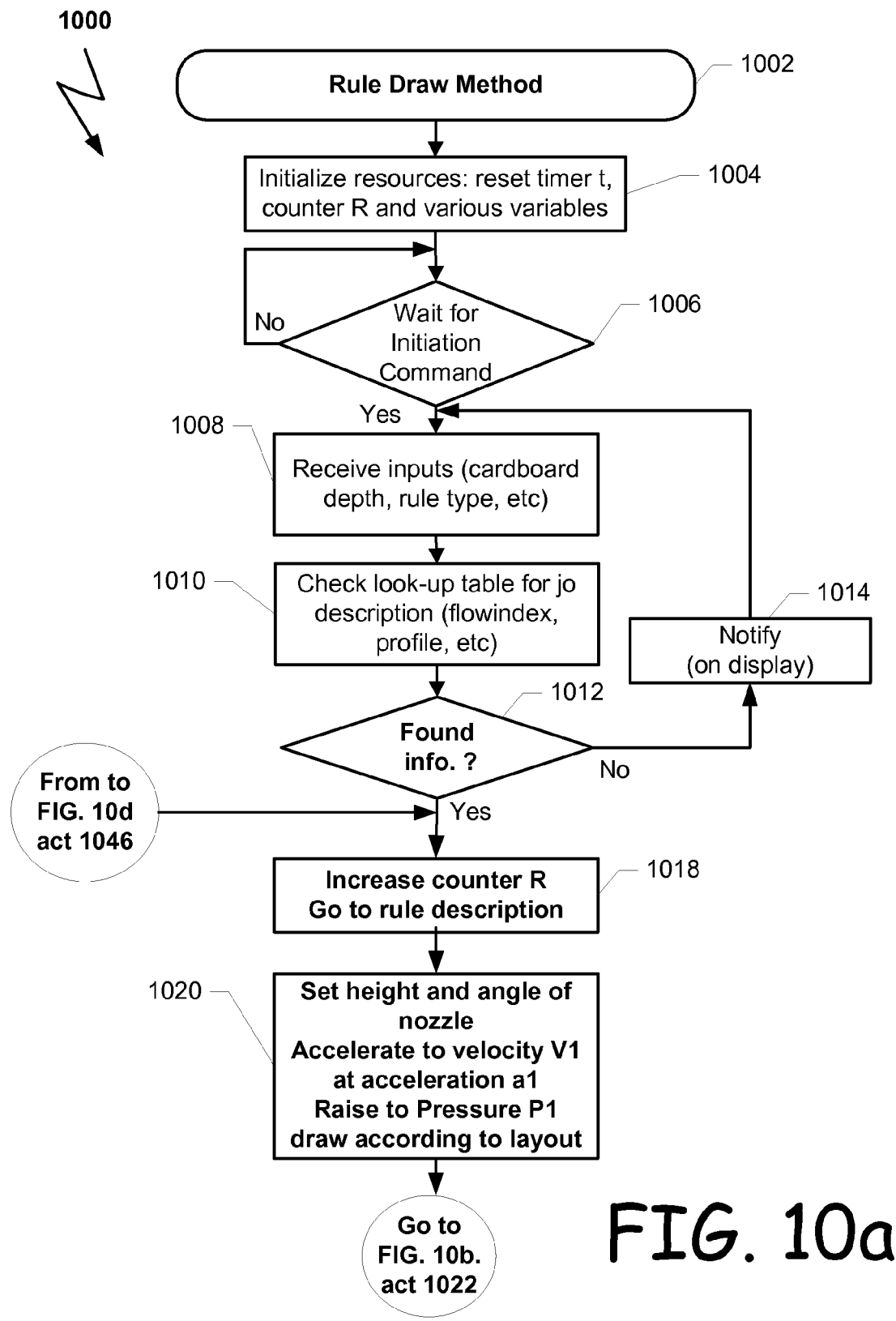
FIGS. 10a-d are schematic illustrations of a flowchart showing relevant acts of an exemplary method of a drawing process, according to exemplary teachings of the present disclosure.
Figure 10B:
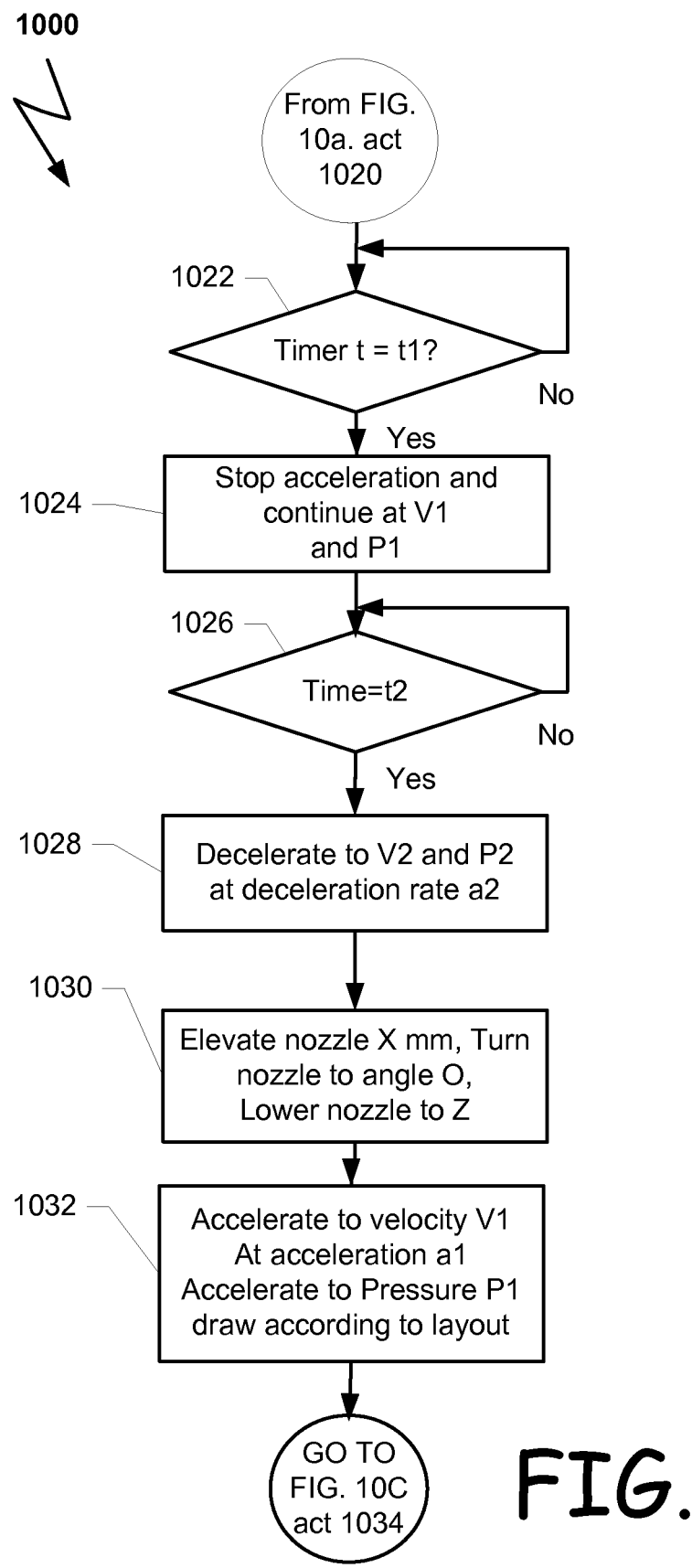
Figure 10C:
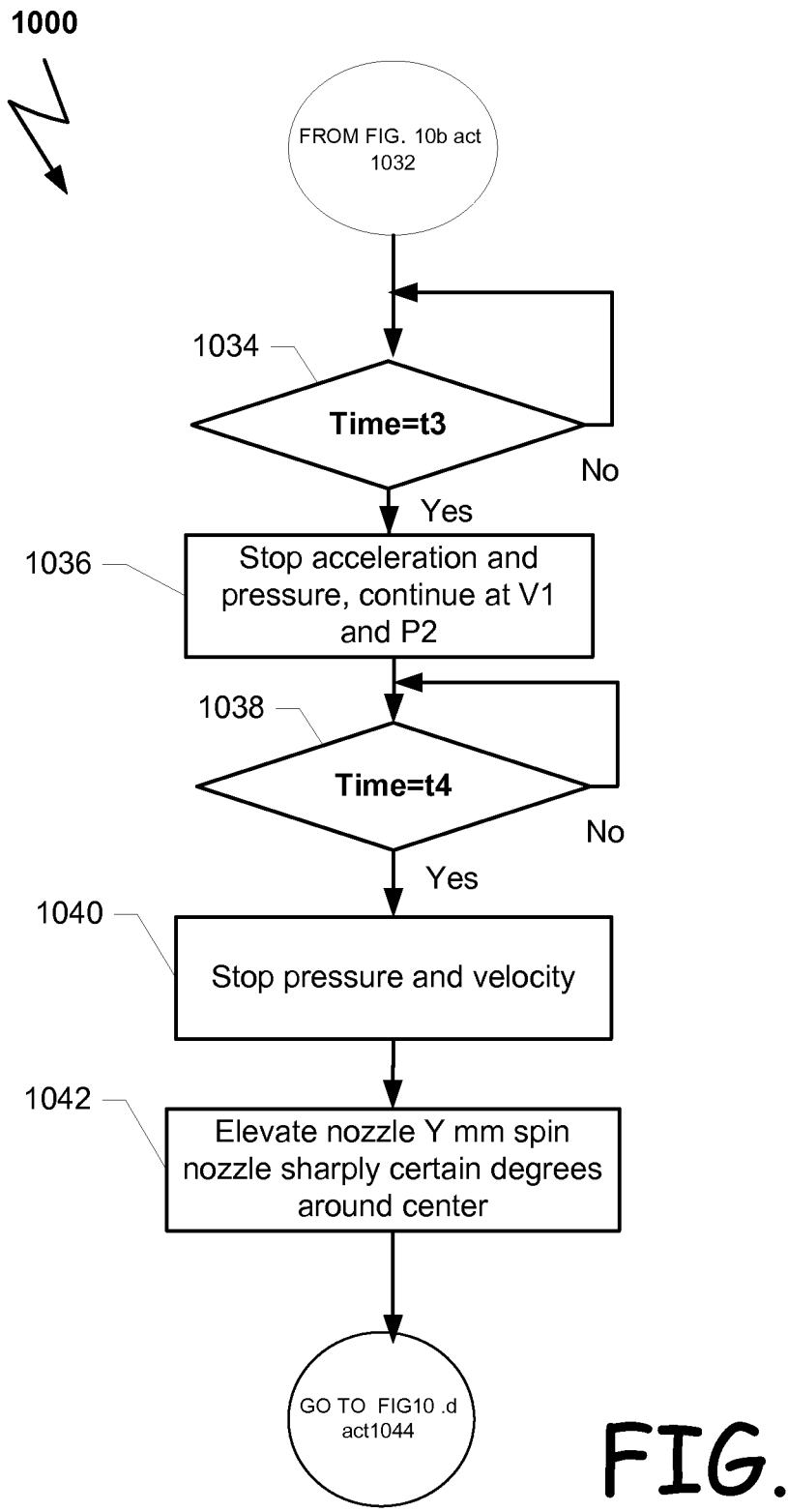
Figure 10D:
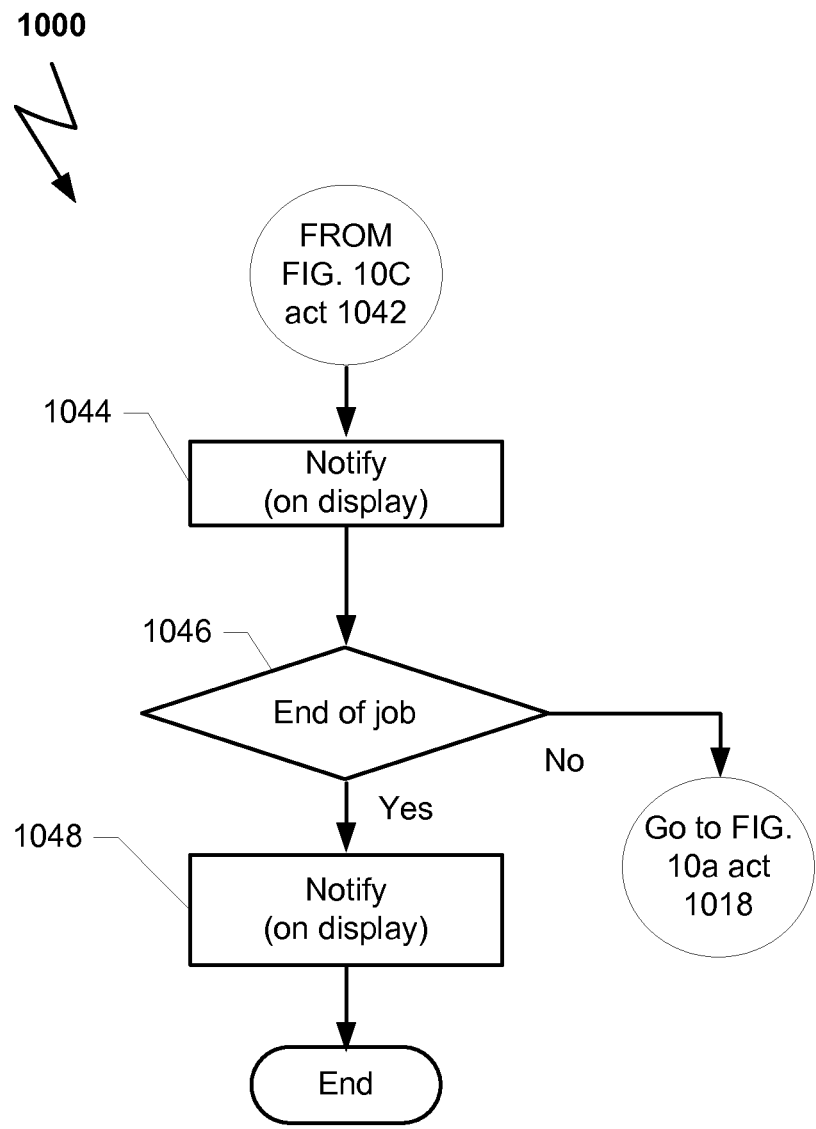

The method 1000 continues at act 1034 of FIG. 10c by entering a delay loop until the value of the timer t is equal to t3 1034. When the timer t value is equal to t3 1034, the acceleration of the velocity of the drawing head modules and the raising of the pressure by the pressure actuator may be stopped 1036. The drawing head modules may continue drawing at velocity V1 and the pressure actuator may continue at pressure P1 1036. Next, the method 1000 may enter a delay loop until the value of timer t is equal to t4 1038. When the timer t value is equal to t4 1038, the pressure imposed by the pressure actuator may be stopped 1040, and the motion of the drawing head modules may be stopped 1040 as well. The nozzle may be elevated to a desired level by raising it Y mm and spun sharply 1042 at a certain degrees (180-360 degrees for example) degree around its center, for example. The spinning of the nozzle operates to cut the flexible material from the nozzle. In an alternate embodiment, an air-pulse may be used in order to cut the flexible material from the nozzle as disclosed above in conjunction with the description of FIG. 8e, for example. Yet in other embodiments, a shutter may be used as disclosed in FIGS. 8e-8f. In even other exemplary embodiments, a guillotine may be utilized to cut the flexible material from the nozzle, or an air knife may be used to cut the flexible material from the nozzle at once, and so on. The method 1000 may then proceed to act 1044 at FIG. 10d.

At this point in the process, the method 1000 may provide a notice or indicator 1044, such as by turning on a light, making a sound or placing text or icons on a display as non-limiting examples, that the Surface-adhesive rule (SAR) has been drawn. Next, the method 1000 determines whether all of the SARs have been drawn and the job has been finished 1046. If the job is finished 1046, then the method 1000 may provide a notice or indicator 1048, such as by turning on a light, making a sound or placing text or icons on a display for example, that the job as been finished and method 1000 may end. If the job has not yet been finished and more SARs need to be drawn 1046, then method 1000 may return to act 1018 at FIG. 10a to start drawing the next SAR.

Figure 11:
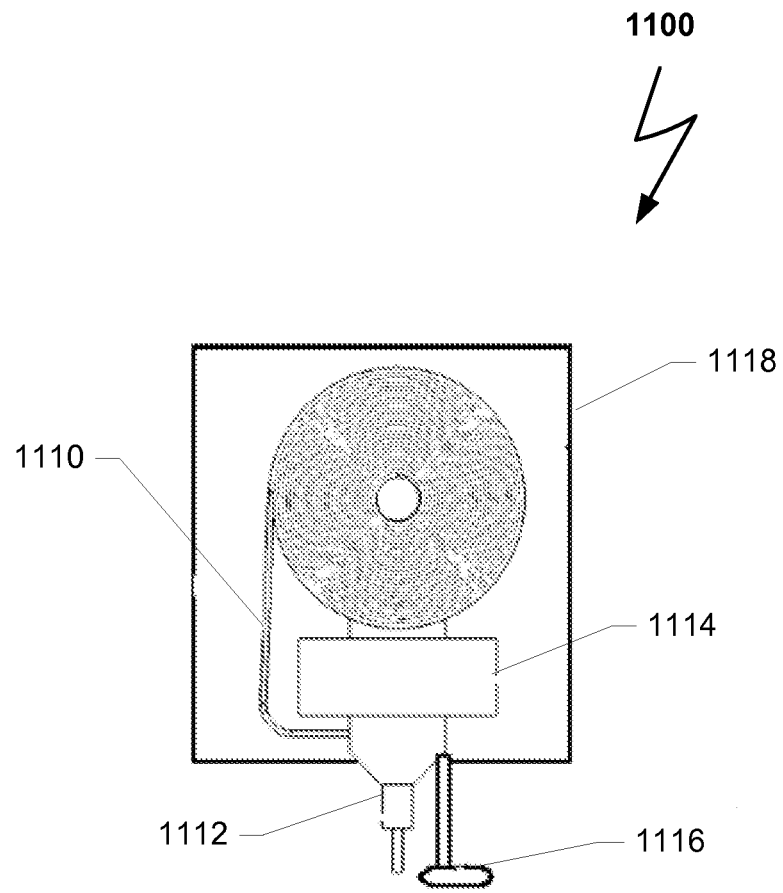
FIG. 11 depicts a simplified diagram with relevant elements of an alternative exemplary surface-adhesive-rule technology (SART) system in accordance with some exemplary embodiments of the present disclosure.

FIG. 11 depicts a simplified diagram with relevant elements of yet another exemplary surface-adhesive-rule technology (SART) system 1100. In an exemplary SART system 1100, the deposited flexible material may be in the form of a flexible strip 1110. The flexible strip 1110 may be positioned in a cartridge 1118. The flexible strip 1110 may be rolled as shown in FIG. 11 or may be folded in other ways, such as a fan configuration. The cartridge 1118 may be associated with a rail 1114. The rail 1114 may be similar to the rail 430 described in FIG. 4a, for example. In some embodiments, the cartridge 1118 may be associated with a nozzle 1112. The flexible strip 1110 may be bent and/or curved during deposition in order to draw the desired pattern of SAR.

In some exemplary embodiments, the flexible strip 1110 may be cut by a knife 1116 when the SAR drawing reaches the end of the SAR. In alternate embodiments, other terminator-systems and techniques may be used. The deposited flexible strip 1110 may be bonded to the surface of the SARD's body (not shown in drawing) by adhesion for example.

FIG. 12a depicts a schematic illustration of relevant elements of yet another exemplary embodiment of a surface-adhesive-rule technology (SART) system 1200 depositing pieces of material 1212. Exemplary material 1212 may be pieces of magnetic material that are to be deposited onto a SARD's body 1220. The SART system 1200 may include a magazine 1210 in which small pieces of magnetic material 1212 are positioned. A shear 1222 may be adapted to move in directions along arrow 1226 and push single pieces 1218 out of the magazine 1210 to the opening of a channel 1219. In an exemplary embodiment, an applicator 1216 may push the piece of material 1218 through the channel 1219 toward a SARD's body 1220 by a motor 1214. The SARD's body 1220 and/or SART system 1200 may move so that a SAR 1224 is drawn by depositing the material 1218 onto the SARD's body 1220 in a required place.

Figure 12:
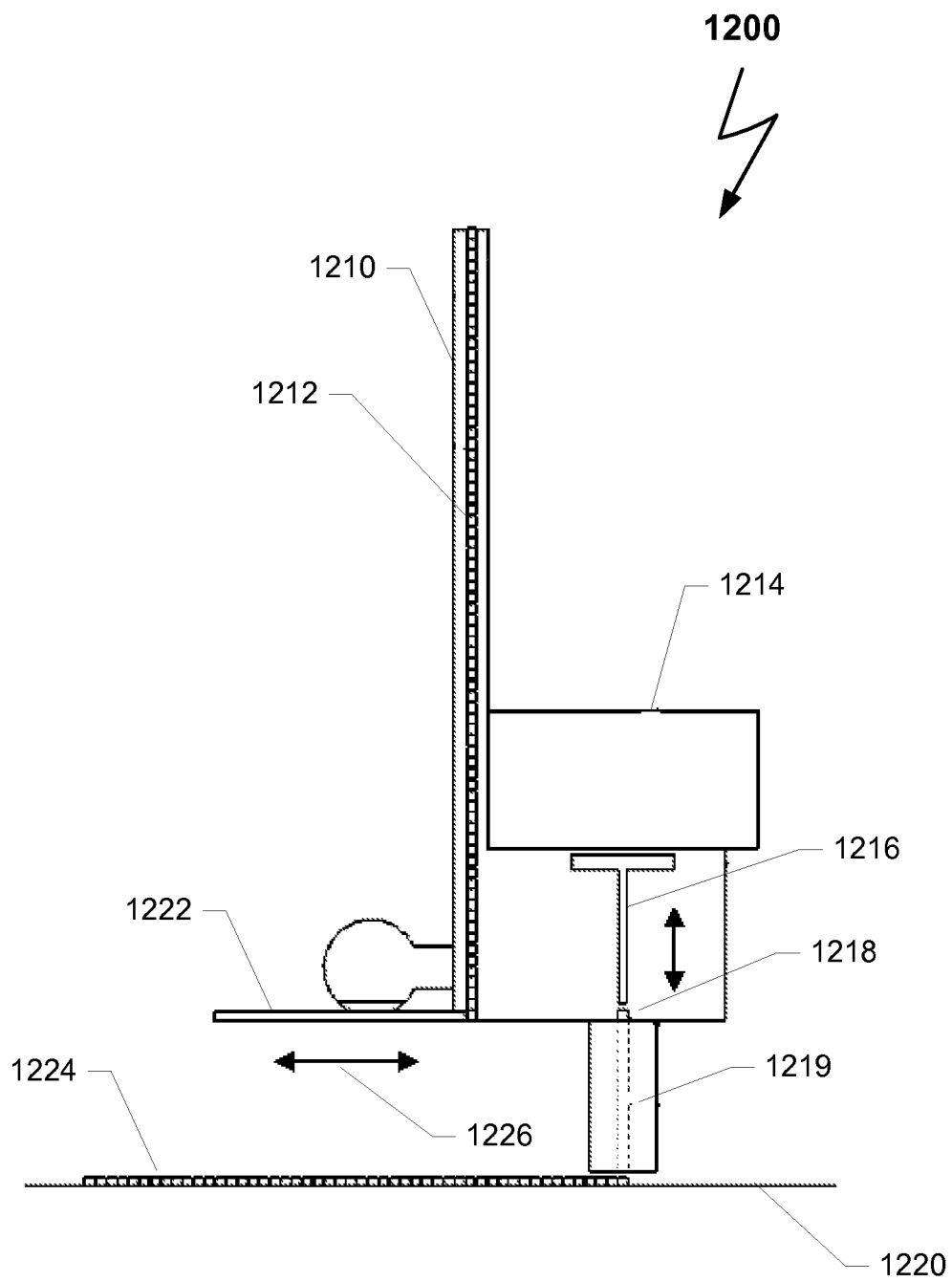
FIG. 12 depicts a schematic illustration of relevant elements of yet another exemplary surface-adhesive-rule technology (SART) system depositing pieces of material in accordance with some exemplary embodiments of the disclosure.
Figure 13:
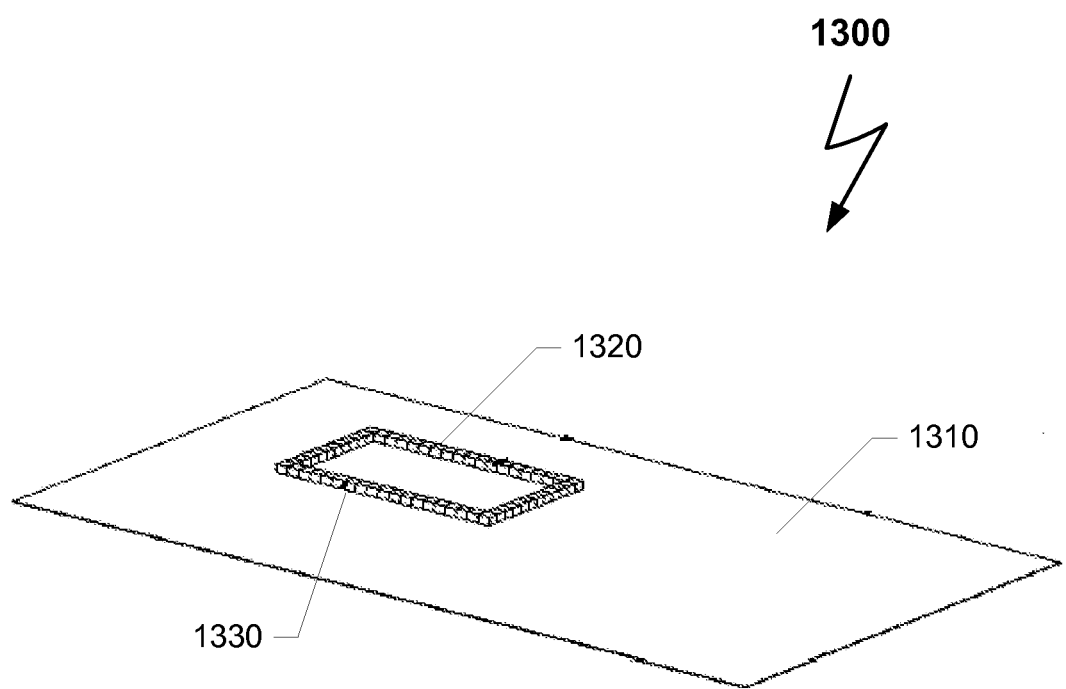
FIG. 13 depicts a schematic illustration of relevant elements of an exemplary SAR die (SARD) produced with the SART system shown in FIG. 12, according to exemplary teaching of the present disclosure.

FIG. 13 depicts a schematic illustration of relevant elements of an exemplary SARD 1300 that may be produced by SART system 1200 illustrated in FIG. 12 above. The SAR die 1300 may be comprised of a SARD body 1310 and one or more SARs 1320 that are bonded to the surface of the SARD body 1310. The SARD body 1310 may be made of iron or other magnetic or pseudo magnetic material. As such, the bonding may wholly provided by magnetic forces, for example, or additional adhesive or bonding techniques may be used to further strength the bond. Each SAR 1320 may be made of a plurality of magnetic pieces 1330. The magnetic pieces 1330 may be deposited adjacent to each other in accordance with the layout of the required SARD, thus creating a continuous SAR 1320.

In an exemplary embodiment, the pieces of material 1330 may have a size of approximately 1 mm cube, such as for example between 500-700 microns cube. However, it will be appreciated that the pieces of material can also be in other sizes as well as shapes, such as rectangular cubes, trapezoids, elongated, etc. In an exemplary embodiment, a peel strength between the pieces of material 1330 and the SARD's body 1310 may be about 13 gr/mm$^2$. In some exemplary embodiments, an adhesive is provided between the magnetic pieces 1330 and the SARD's body 1320. Optionally, an adhesive is provided on the bottom surface of the magnetic material 1330 facing the SARD's body 1320. Alternatively or additionally, adhesive is provided on the SARD's body 1320. Further, the adhesive may be deposited on the SARD's body 1320 by a nozzle (not shown in the drawing).

Figure 14A:
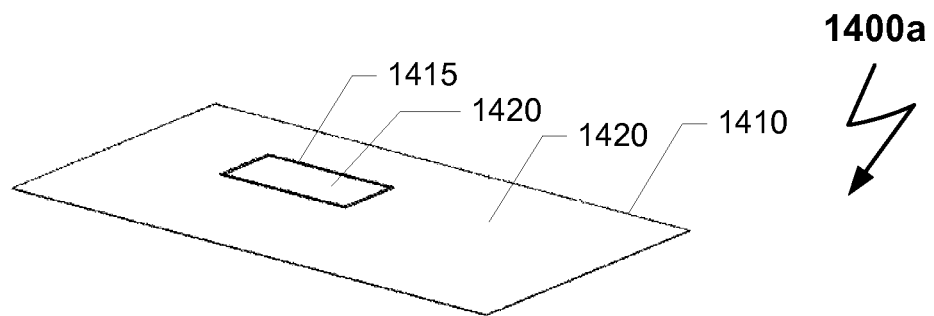
FIGS. 14a-c are schematic illustrations of SAR dies (SARDs) produced in accordance with yet other embodiments of the present disclosure.

FIG. 14a illustrates a schematic portion with relevant elements of a SARD 1400a in accordance with yet another exemplary embodiment of the present disclosure. The entire surface or portions of the surface of the surface of the SARD's body 1410 may be coated with a low surface tension material 1420. Pre-defined areas, according to the layout, of the surface of the SARD's body 1410 may then be coated with a high surface tension material 1415. In some embodiments, the low surface tension material 1420 can be laid on the entire surface or portions of the surface of the SARD's body 1410 and then the high surface tension material 1415 can be laid over the low surface tension material 1420 or, the low surface tension material 1420 and the high surface tension material 1415 can be applied onto mutually exclusive surface areas of the SARD's body 1410.

Figure 14B:
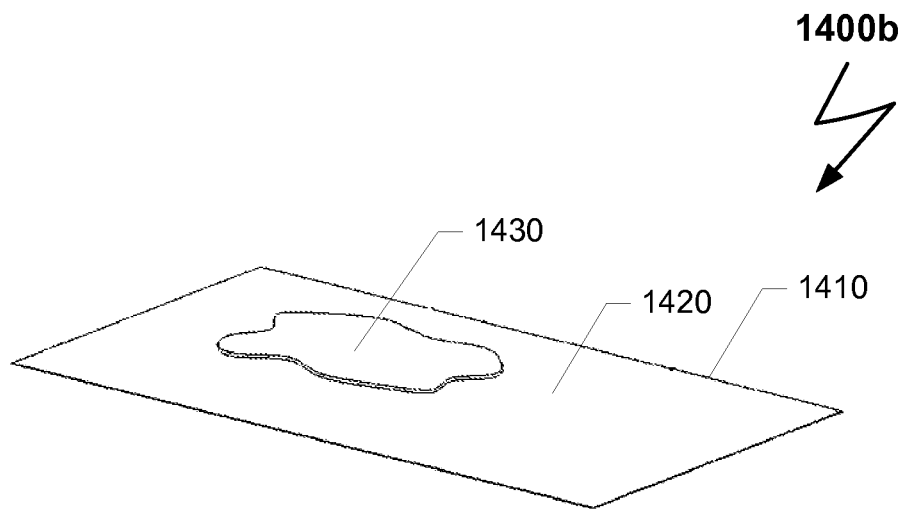
Figure 14C:
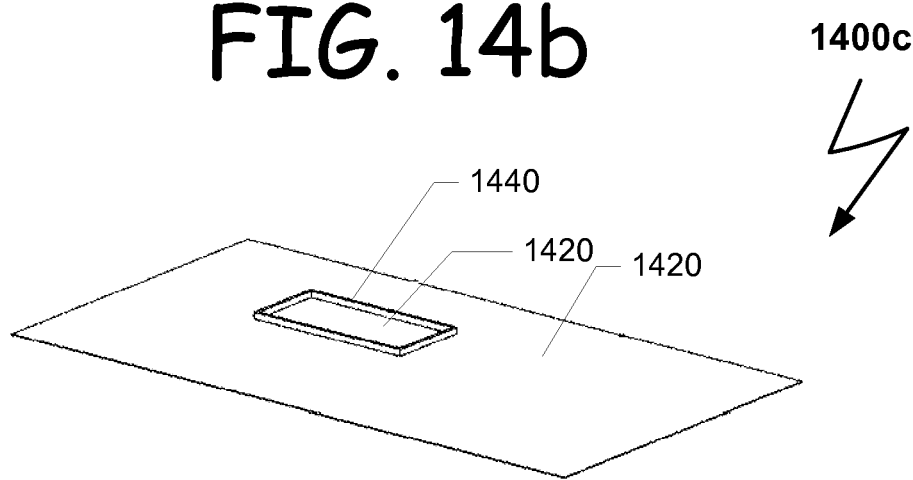

A liquid or gel like material 1430 may be deposited on the surface of the SARD's body 1410, as shown in FIG. 14b. The liquid or gel like material 1430 may then coalesce from the low surface tension areas to the high surface tension areas, thereby creating one or more SARs 1440 at the desired locations, as shown in FIG. 14c.

In alternate exemplary embodiments, the liquid or gel like material 1430 may be deposited only on areas surrounding the high surface tension areas. Alternatively, liquid or gel like material 1430 may be deposited on the entire body 1410 or most of surface of the SARD's body 1410. Optionally, the liquid or gel like material 1430 may be flexible material based on polymer.

The deposited liquid or gel like material 1430 will generally move to the high surface tension area after a certain period of time (between a few minutes and 2-3 hours, for example). In exemplary embodiments the liquid or gel like material 1430 may be left at room temperature of about 25-30° C. Alternatively, the temperature of the deposited liquid or gel like material 1430 may be raised by about 10° C. which may reduce the time of coalescing of the liquid or gel like material 1430. In addition, agitators or vibrators may be used to vibrate the SARD and thereby assist in accelerating the coalescing of the material 1430.

In other exemplary embodiments the liquid or gel like material 1430 may be hardened only after a period of time after deposition. The height of the created SARs 1440 may be a few millimeters, such as 700 microns-1.25 mm for example. The width of the created SARs 1440 may be a few millimeters, such as 700 microns –1.25 mm for example.

In some exemplary embodiments of the present disclosure the surface of the SARD's body 1410 may be formed of or coated with a high surface tension material and then coated or primed over this layer with a low surface tension material. A desired layout of the SARs may be engraved in the low surface tension coating, such that the desired layout will expose the high surface tension material present beneath the low surface tension coating while the rest of SARD's body 1420 will be coated with a low surface tension material. Exemplary high surface tension materials may include, but are not limited to, PET, Corona treated PP, Polyamide and Aluminum laminate. Exemplary low surface tension materials are silicon, TFE or Polyethylene.

Figure 15:
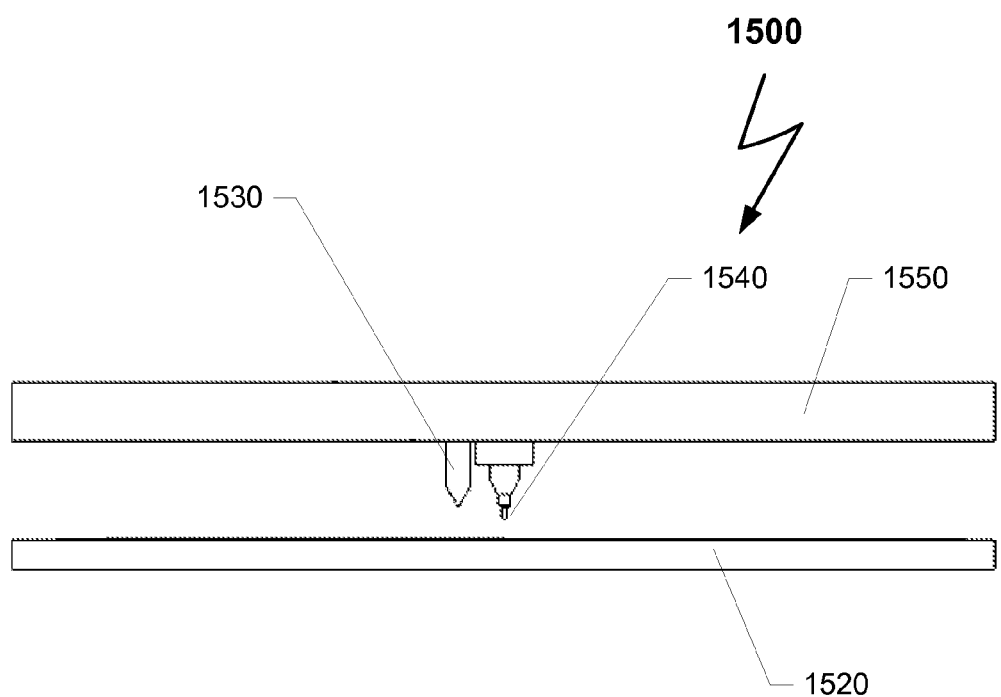
FIG. 15 depicts a schematic illustration of relevant elements of another exemplary surface-adhesive-rule technology (SART) system, according to exemplary teaching of the present disclosure.

FIG. 15 depicts a schematic illustration of relevant elements of yet another exemplary surface-adhesive-rule technology (SART) system 1500. The SART system 1500 may include an engraving mechanism 1530, a rail 1550 and a nozzle 1540. The engraving mechanism 1530 may be any suitable device that can provide adequate engraving, such as but not limited to, a laser and/or a mechanical tool for example. The rail 1550 is suitable for both the nozzle 1540 and the engraving mechanism 1530 to be positioned on the surface of the rail 1540. Alternatively, the engravings may be performed in a system other then the SAR drawing system. In an exemplary operation of the illustrated SART system 1500, the engraving mechanism 1530 may be used to etch an area of the SARD 1520 to receive a SAR pattern and then the nozzle 1540 can apply material for the SAR within the etched areas.

In alternate embodiment the module 1530 may be a scrapper which may be used to milled/scrap the edge of a drawn cutting SAR. In yet another alternate embodiment the module 1530 may be a hardening module, such as but not limited to a light source, a air knife, etc.

Figure 16A:
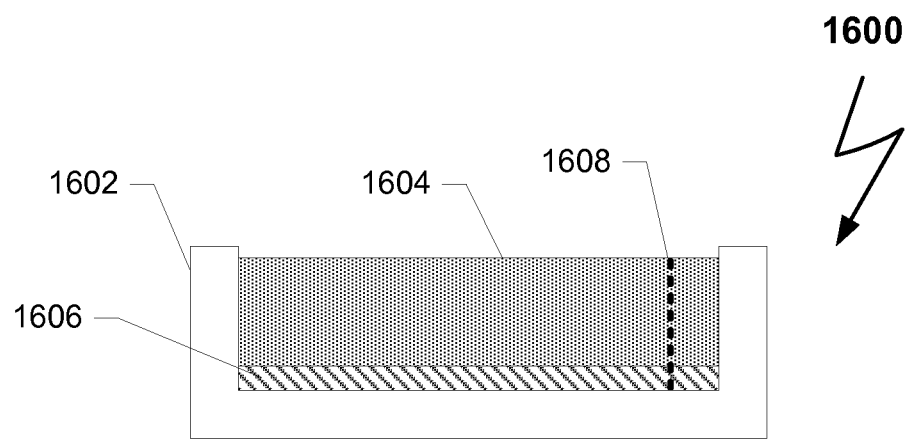
FIG. 16a-b depicts schematic illustration of relevant elements of a portion of an exemplary embodiment of a molding system for creating a SARCD and/or SARD body, according to exemplary teaching of the present disclosure.

FIG. 16a depicts relevant elements of a portion of an exemplary embodiment of a molding system 1600. Molding system 1600 may be used in the creation a SAR counter die body and/or a SAR die body. Molding system 1600 may comprise an open top mold 1602, into which gel/liquid like material 1604 may be input. The gel/liquid like 1604 material may comprise one or more different polymers. Exemplary polymer may be: polyurethane, monothane with shore hardness of around A30-A70 of DOW company, etc. Further the gel/liquid like material may comprise one or more different additives. Exemplary additives may be accelerators such as, but not limited to: Dibutyltin dilaurate. Other exemplary additives may be: silica, ceramics, metal, various fibers, different fillers. The open top mold 1602 may be coated with release coating (not shown in drawing). Exemplary release coating may be Cilrelease 905 of DOW Company.

In some embodiments a flexible film 1606 may be added to be associated to the gel/liquid like material 1604. The flexible film 1606 may be made of different materials. Exemplary materials may be: PET (Polyethylene terephthalate), PA (Polyamide), polypropilen, stainless steel, Aluminum (Al) and/or a combination of them, etc. In some embodiments the flexible film 1606 may be added on top of the gel/liquid like material 1604, while in other embodiments it may be added at the bottom of the gel/liquid like material 1604. Furthermore the flexible film 1606 length may exceed the open mold length, in these cases the open top mold 1602 may have fitted apertures (not shown in drawings).

The mold with the gel/liquid like material 1604 and the flexible film 1606 may pass a hardening process. Exemplary hardening may be curing by heat, curing by light (UV, infra red, visible light, etc), curing by cooling, and so on. The temperature and time of the hardening may be according to the gel/liquid like material's 1604 composition of ingredients and/or its dimensions. For example, hardening of polyurethane may be around 135 degrees Celsius for 6 hours. In alternate embodiment the hardening of polyurethane may be around 135 degrees Celsius for a few minutes if added to it are additives with high sensitivity to heat, and so on.

In some exemplary embodiments after the hardening process, the flexible film 1606 may be pierced 1608. The piercing may be done by different techniques. Exemplary techniques may be: by a puncher, a laser, etc.

Figure 16B:
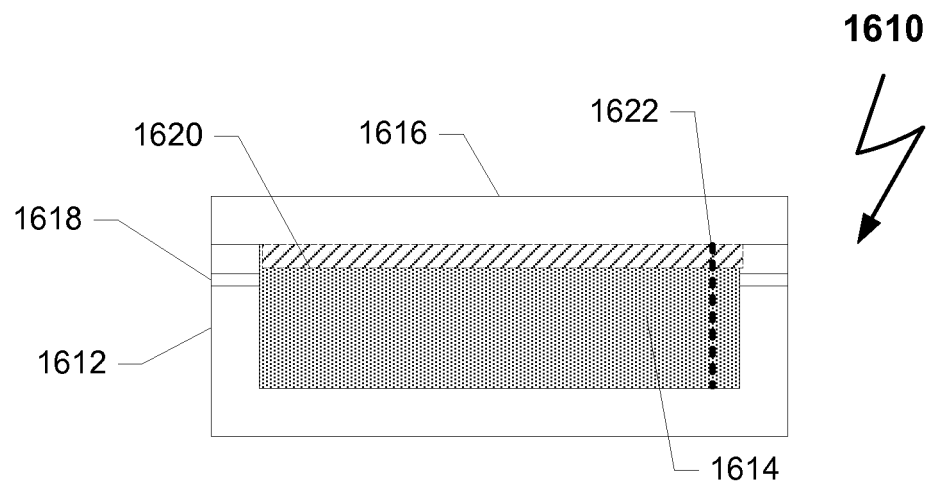

FIG. 16b depicts relevant elements of a portion of an exemplary embodiment of a closed molding system 1620. Closed molding system 1620 may be used in the creation a SAR counter die body and/or a SAR die body. Closed molding system 1620 may comprise a closed mold 1622, into which gel/liquid like material 1614 may be input with or without a flexible film 1606, similar to the one disclosed in FIG. 16a. Closed molding system 1620 may further comprise a lid 1626, and one or more excess release channels 1628. The gel/liquid like material 1614 may be injected into the mold 1612 by extruder points in the mold 1612 (not shown in the drawing) or placed with or without a flexible film 1606 inside the mold 1622 when the lid 1626 is open and only then the lid may be placed closed 1626.

The mold with the gel/liquid like material 1614 with or without a flexible film 1606 may pass hardening process. Exemplary hardening may be curing by heat, curing by light (UV, infra red, visible light, etc), curing by cooling, etc. The conditions and times of the hardening techniques may be similar to the ones disclosed in conjunction with FIG. 16a. The mold 1622 may be coated with release coating (not shown in drawing). Exemplary release coating may be Cilrelease 905 of DOW Company. In some exemplary embodiments after the hardening process, the flexible film 1606 may be pierced 1630. The piercing may be done by different techniques. Exemplary techniques may be: by a puncher, a laser, etc.

Figure 17A:
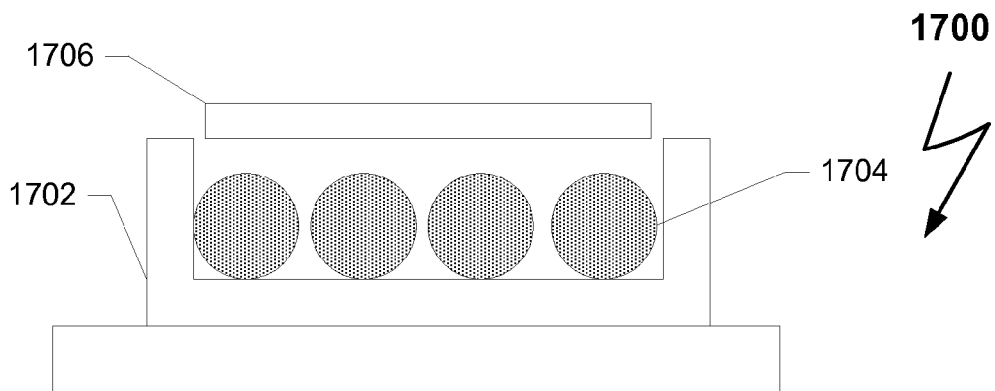
FIG. 17a-b depicts schematic illustration of relevant elements of a portion of an exemplary embodiment of a press system for creating a SARCD and/or SARD body, according to exemplary teaching of the present disclosure.

FIG. 17a depicts relevant elements of a portion of an exemplary embodiment of a press system 1700. Press system 1700 may be used in the creation a SAR counter die body and/or a SAR die body. Press system 1700 may comprise a base 1708, a mold 1702, and a top 1706. Top 1076 may be part of a pressure actuator (a piston pressure actuator, for example). A plurality of materials 1704 may be input into the mold 1702. Materials 1704 such as, but not limited to: different polymers, additives, etc. Exemplary polymers may be: polyurethane, EPDM (ethylene propylene diene Monomer rubber), silicon, acrylic, etc. Different additives may be: Graphite, Dibutyltin dilaurate, silica, ceramics, metal, various fibers, and/or different fillers.

Figure 17B:
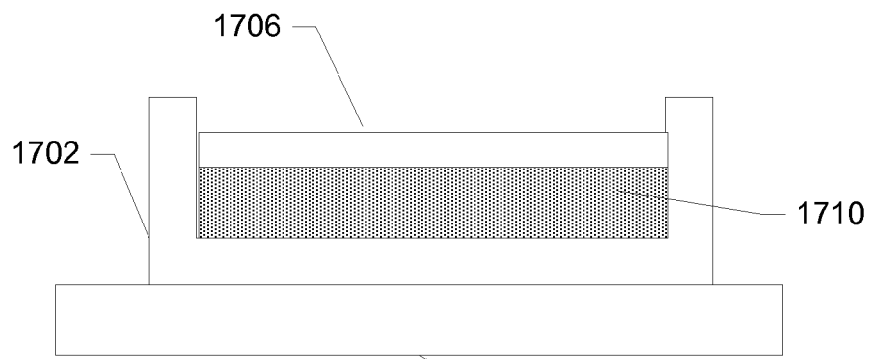

The press process may comprise one or more phases. For example a first phase may comprise flatting the materials 1704 as depicted in FIG. 17b material 1710. This phase may comprise heating the materials 1704 and exerting pressure on them by the top 1706, for example. The second phase may comprise exerting higher pressure and heat and hardening the material. Hardening may be done by curing via light (UV, Infra red, visible light, etc), or by heating, or by cooling.

Exemplary conditions for the second phase for different materials is disclosed in table 11 below:

TABLE 11

| Material Type | Temperature [C.] | Pressure [bar] | Time [sec] |
|---|---|---|---|
| EPDM | 135 | 5 | 30 |
| Silicon | 180 | 8 | 12 |

Figure 17C:
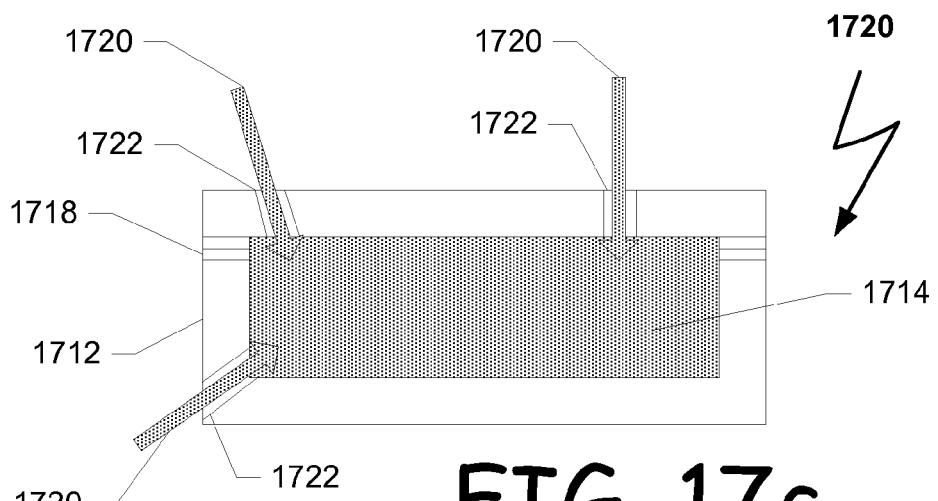
FIG. 17c depicts schematic illustration of relevant elements of a portion of an exemplary embodiment of a inject/extruder system for creating a SARCD and/or SARD body, according to exemplary teaching of the present disclosure.

FIG. 17c depicts relevant elements of a portion of an exemplary embodiment of an injection/extruder molding system 1720. Injection/extruder molding system 1720 may be used in the creation a SAR counter die body and/or a SAR die body. Injection/extruder molding system 1720 may comprise: a closed mold 1712, one or more injecting apertures 1722, one or more excess release channels 1718. Liquid/gel like material may be heated and injected 1720 with pressure to the closed mold 1712 via the one or more injecting apertures 1722. The Liquid/gel like material may be different polymers, additives, etc. Exemplary polymers may be: polyurethane, EPDM (ethylene propylene diene Monomer rubber), silicon, acrylic, etc. Different additives may be: Graphite, Dibutyltin dilaurate, silica, ceramics, metal, various fibers, different fillers, etc. The mold 1712 may be coated with release coating (not shown in drawing). Exemplary release coating may be Cilrelease 905 of DOW Company. Next a hardening process may be implemented. Hardening may be done by curing via light (UV, Infra red, visible light, etc), or by heating, or by cooling. Exemplary conditions for the hardening for different materials are disclosed in table 11 above.

Figure 18:
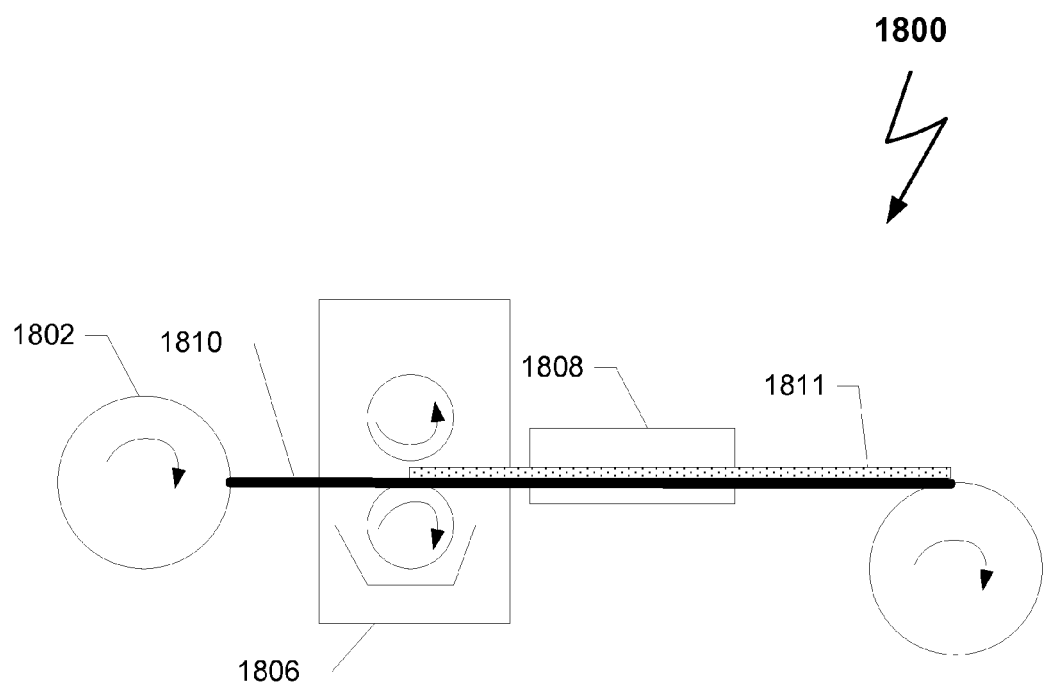
FIG. 18 depicts schematic illustration of relevant elements of a portion of an exemplary embodiment of a coating system for creating a SARCD and/or SARD body, according to exemplary teaching of the present disclosure.

FIG. 18 depicts relevant elements of a portion of an exemplary embodiment of a coating system 1800. Coating system 1800 may be used in the creation a SAR counter die body and/or a SAR die's body. Exemplary liquid/gel-like material that may be used in the coating system 1800 may be different polymers with different additives. Exemplary polymers may be silicon, acrylic, etc. Exemplary additives can be: Graphite, Dibutyltin dilaurate, silica, ceramics, metal, various fibers, and/or different fillers. In some embodiments the liquid/gel-like material may be solvent base. Exemplary solvent may be: MEK (Methyl Ethyl Ketone), Toluene, etc.

Coating system 1800 may comprise: an un-winder 1802, a coating head 1806, a chamber 1808, and a winder 1812. Chamber 1808 may comprise an oven, a light radiator, and or a cooling mechanism, for example. On the un-winder 1802 a film 1810 may be winded. The film may be a PET (Polyethylene terephthalate), PA (Polyamide), polypropilen, stainless steel, Aluminum (Al) and/or a combination of them, etc. Winder 1812 may pull and wind the film on the other end of the coating system 1800. The film may then pass the coating head 1806. The coating head 1806 may coat the film with a layer of the liquid/gel-like material 1811. Next the coated film may pass through a chamber 1808 for hardening. In some embodiments there may not be a need for the chamber 1808. The coated and hardened film may pass through a surface treatment (not shown in the drawing). Exemplary surface treatment may be polish, grinding, scarping, etc. The coated and hardened film may then be winded on the winder 1812, for example.

In some exemplary embodiments there may be one or more coating heads 1806 one or more chambers 1808. In other exemplary embodiments the coated film may pass in a loop through the coating heads 1806 one or more chambers 1808. The one or more coating heads 1806 may comprise different liquid/gel-like material 1811.

In exemplary embodiments the creation a SAR counter die's body and/or a SAR die's body may be implemented in one or more different methods (molding, press, coating, etc) and/or a combination of them. In some of the molding techniques a negative pattern may be used inside the mold in order to create a required pattern and/or layout for the SAR counter die's body and/or a SAR die's body.

Other exemplary embodiments may use a thermoplastic material for the creation a SAR counter die's body. In such embodiments an additional phase may be added in the creation. The additional phase may comprise imprinting the SARs on the thermoplastic material at a required temperature. Exemplary temperature may be around 69 C degree for example.

Figure 19:
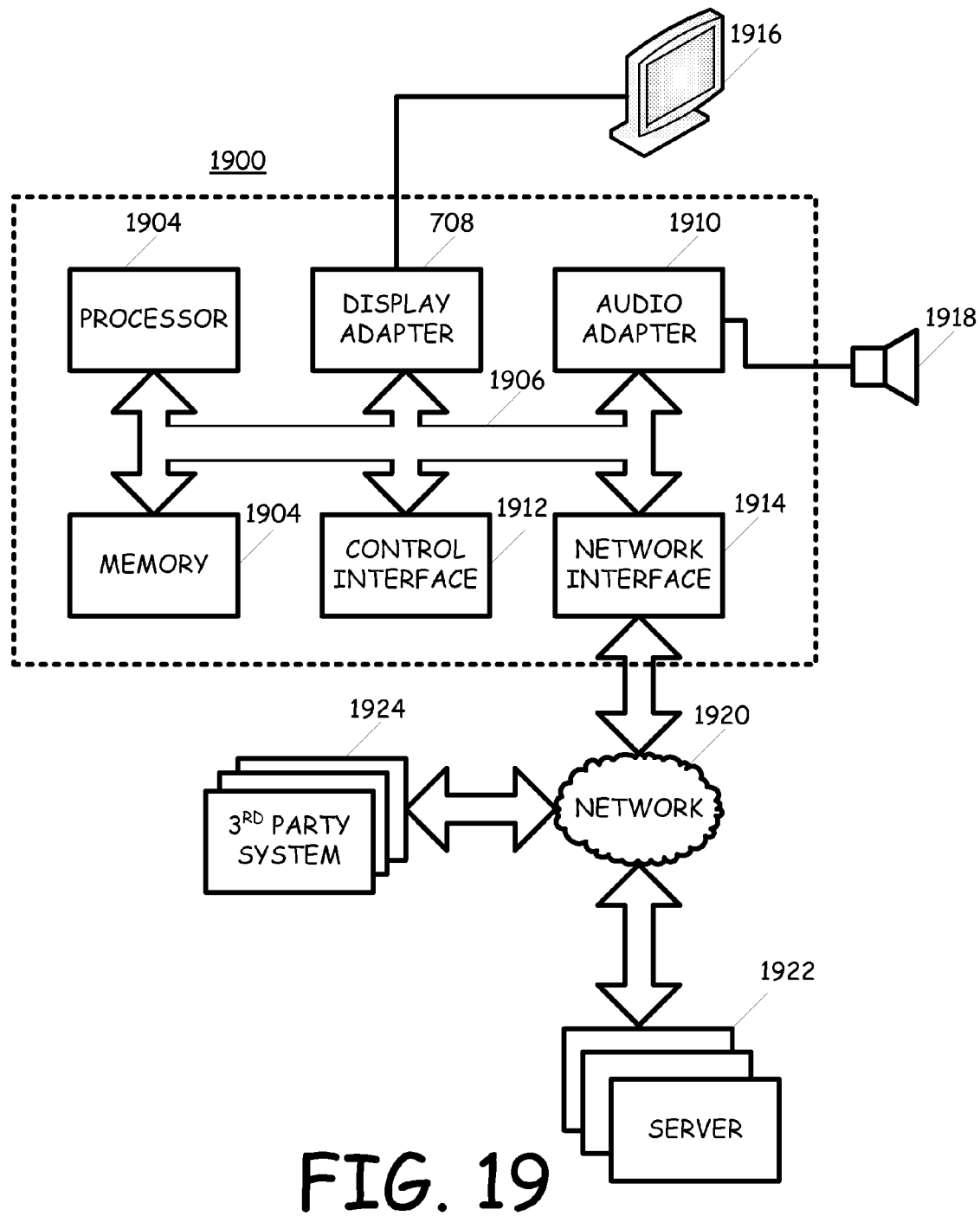
FIG. 19 depicts schematic illustration of relevant elements of a portion of an exemplary embodiment of a SART controller, according to exemplary teaching of the present disclosure.

FIG. 19 is a functional block diagram of the components of an exemplary embodiment of system or sub-system operating as a controller or processor 1900 that could be used in various embodiments of the disclosure for controlling aspects of the various embodiments. It will be appreciated that not all of the components illustrated in FIG. 19 are required in all embodiments of the activity monitor but, each of the components are presented and described in conjunction with FIG. 19 to provide a complete and overall understanding of the components. The controller can include a general computing platform 1900 illustrated as including a processor/memory device 1902/1904 that may be integrated with each other or, communicatively connected over a bus or similar interface 1906. The processor 1902 can be a variety of processor types including microprocessors, micro-controllers, programmable arrays, custom IC's etc. and may also include single or multiple processors with or without accelerators or the like. The memory element of 1904 may include a variety of structures, including but not limited to RAM, ROM, magnetic media, optical media, bubble memory, FLASH memory, EPROM, EEPROM, etc. The processor 1902, or other components in the controller may also provide components such as a real-time clock, analog to digital convertors, digital to analog convertors, etc. The processor 1902 also interfaces to a variety of elements including a control interface 1912, a display adapter 1908, an audio adapter 1910, and network/device interface 1914. The control interface 1912 provides an interface to external controls, such as sensors, actuators, drawing heads, nozzles, cartridges, pressure actuators, leading mechanism, drums, step motors, a keyboard, a mouse, a pin pad, an audio activated device, as well as a variety of the many other available input and output devices or, another computer or processing device or the like. The display adapter 1908 can be used to drive a variety of alert elements 1916, such as display devices including an LED display, LCD display, one or more LEDs or other display devices. The audio adapter 1910 interfaces to and drives another alert element 1918, such as a speaker or speaker system, buzzer, bell, etc. The network/interface 1914 may interface to a network 1920 which may be any type of network including, but not limited to the Internet, a global network, a wide area network, a local area network, a wired network, a wireless network or any other network type including hybrids. Through the network 1920, or even directly, the controller 1900 can interface to other devices or computing platforms such as one or more servers 1922 and/or third party systems 1924. A battery or power source provides power for the controller 1900.

In the description and claims of the present disclosure, each of the verbs, "comprise", "include" and "have", and conjugates thereof, are used to indicate that the object or objects of the verb are not necessarily a complete listing of members, components, elements, or parts of the subject or subjects of the verb and further, all of the listed objects are not necessarily required in all embodiments.

As used herein, the singular form "a", "an" and "the" include plural references unless the context clearly dictates otherwise. For example, the term "a material" or "at least one material" may include a plurality of materials, including mixtures thereof.

In this disclosure the words "unit", "element", and/or "module" are used interchangeably. Anything designated as a unit, element, and/or module may be a stand-alone unit or a specialized module. A unit, element, and/or module may be modular or have modular aspects allowing it to be easily removed and replaced with another similar unit, element, and/or module. Each unit, element, and/or module may be any one of, or any combination of, software, hardware, and/or firmware. Software of a logical module can be embodied on a computer readable medium such as a read/write hard disc, CDROM, Flash memory, ROM, etc. In order to execute a certain task a software program can be loaded to an appropriate processor as needed.

The present disclosure has been described using detailed descriptions of embodiments thereof that are provided by way of example and are not intended to limit the scope of the disclosure. The described embodiments comprise different features, not all of which are required in all embodiments of the disclosure. Some embodiments of the present disclosure utilize only some of the features or possible combinations of the features. Many other ramifications and variations are possible within the teaching of the embodiments comprising different combinations of features noted in the described embodiments.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination or as suitable in any other described embodiment of the invention.

It will be appreciated by persons skilled in the art that the present disclosure is not limited by what has been particularly shown and described herein above. Rather the scope of the disclosure is defined by the claims that follow.

What is claimed is:

1. A surface adhesive rule die comprising:
(a) a film substrate forming a die body;
(b) a plurality of elongate rules, each of said rules having:
a first elongate surface adhesively attached to a broad surface of said film substrate, and
an elongate protrusion distally protruding from said die body, said elongate protrusion having an elongate die surface, said elongate die surface including a polymeric material;
the surface adhesive rule die adapted such that when disposed generally opposite a counter die surface, and generally opposite a top surface of a cardboard workpiece disposed between said elongate die surface and said counter die surface, a pressure exerted by said elongate die surface against said cardboard workpiece forms an elongate depression in said top surface of said cardboard workpiece.

2. The surface adhesive rule die of claim 1, said film substrate being a polymeric film substrate.

3. The surface adhesive rule die of claim 1, said film substrate being sufficiently flexible to be flexed from a flat configuration into a cylindrical configuration.

4. The surface adhesive rule die of claim 1, said film substrate being sufficiently flexible such that, from an initial, flat configuration, said film substrate can be wrapped around a drum.

5. The surface adhesive die rule of claim 4, wherein said drum is a drum of a die base.

6. The surface adhesive die rule of claim 4, further comprising said drum.

7. The surface adhesive die rule of claim 6, further comprising a counter die having said counter die surface.

8. The surface adhesive rule die of claim 1, said first elongate surface being adhesively attached to said broad surface along substantially an entire length of said first elongate surface.

9. The surface adhesive rule die of claim 1, said first elongate surface being adhesively attached directly to said broad surface of said film substrate.

10. The surface adhesive rule die of claim 1, each of said elongate rule dies being adhesively attached to said broad surface of said film substrate via an intermediate adhesive material disposed therebetween.

11. The surface adhesive rule die of claim 1, at least one elongate rule of said plurality of elongate rules including at least two layers.

12. The surface adhesive rule die of claim 1, at least one elongate rule of said plurality of elongate rules including at least two layers made of different materials.

13. The surface adhesive rule die of claim 1, at least one elongate rule of said plurality of elongate rules including at least a bottom layer proximate to said die body, and a top layer, disposed above said bottom layer, distal to said die body, said top layer being more elastic with respect to said bottom layer.

14. The surface adhesive rule die of claim 1, at least one elongate rule of said plurality of elongate rules having a generally rectangular cross-section.

15. The surface adhesive rule die of claim 1, a top portion of at least one elongate rule of said plurality of elongate rules having a generally trapezoidal cross-section, said elongate die surface forming a portion of said trapezoidal cross-section.

16. The surface adhesive rule die of claim 1, a top portion of at least one elongate rule of said plurality of elongate rules having a generally triangular cross-section, said elongate die surface forming a portion of said triangular cross-section.

17. The surface adhesive rule die of claim 1, said elongate die surface of at least one elongate rule of said plurality of elongate rules having a generally rounded profile.

18. The surface adhesive rule die of claim 1, a top portion of at least one elongate rule of said plurality of elongate rules having a generally rectangular cross-section, said elongate die surface forming a portion of said rectangular cross-section.

19. The surface adhesive rule die of claim 1, an uppermost surface of at least one elongate rule of said plurality of elongate rules having an asymmetric profile.

20. The surface adhesive rule die of claim 1, a layer of said film substrate having a thickness of about 25 microns.

21. The surface adhesive rule die of claim 1, said film substrate having a thickness of about 50 microns.

22. The surface adhesive rule die of claim 1, said film substrate having a thickness of about 80 microns.

23. The surface adhesive rule die of claim 1, said film substrate including at least one of the materials selected from the group of polyethylene terephthalate, polyamide, and polypropylene.

24. The surface adhesive rule die of claim 1, said film substrate including a flexible aluminum film.

25. The surface adhesive rule die of claim 1, said film substrate including a flexible stainless steel film.

26. The surface adhesive rule die of claim 1, at least one of said elongate rules having a height of up to several millimeters.

27. The surface adhesive rule die of claim 26, said height being within a range of about 700 microns to about 1250 microns.

28. The surface adhesive rule die of claim 1, at least one of said elongate rules having a width of up to several millimeters.

29. The surface adhesive rule die of claim 28, said width being within a range of about 700 microns to about 1250 microns.

30. The surface adhesive rule die of claim 1, said elongate rule containing silica.

* * * * *